US012186835B2

(12) United States Patent
Hoehm et al.

(10) Patent No.: US 12,186,835 B2
(45) Date of Patent: Jan. 7, 2025

(54) METHODS FOR LASER PROCESSING COATED SUBSTRATES USING A TOP-HAT ENERGY DISTRIBUTION

(71) Applicant: CORNING INCORPORATED, Corning, NY (US)

(72) Inventors: Sandra Hoehm, Munich (DE); Uwe Stute, Neustadt am Rübenberge (DE)

(73) Assignee: Corning Incorporated, Corning, NY (US)

(*) Notice: Subject to any disclaimer, the term of this patent is extended or adjusted under 35 U.S.C. 154(b) by 545 days.

(21) Appl. No.: 17/330,896

(22) Filed: May 26, 2021

(65) Prior Publication Data
US 2021/0387288 A1 Dec. 16, 2021

Related U.S. Application Data

(60) Provisional application No. 63/037,126, filed on Jun. 10, 2020.

(51) Int. Cl.
B23K 26/53 (2014.01)
B23K 26/06 (2014.01)
(Continued)

(52) U.S. Cl.
CPC .......... B23K 26/53 (2015.10); B23K 26/0622 (2015.10); B23K 26/0648 (2013.01);
(Continued)

(58) Field of Classification Search
CPC .. B23K 26/53; B23K 26/0622; B23K 26/082; B23K 26/0648; B23K 26/0734; B23K 26/18; B23K 2101/34; B23K 2103/54
See application file for complete search history.

(56) References Cited

U.S. PATENT DOCUMENTS 9,755,192 B2 * 9/2017 You ........................ B23K 26/40
10,730,783 B2 8/2020 Akarapu et al.
(Continued)

FOREIGN PATENT DOCUMENTS

DE 19962906 A1 4/2001
DE 102016103524 A1 * 8/2017 ......... B23K 26/0006
(Continued)

OTHER PUBLICATIONS

International Search Report and Written Opinion of the International Searching Authority; PCT/US2021/034127; dated Oct. 21, 2020; 12 pages; European Patent Office.

Primary Examiner — Brian W Jennison
Assistant Examiner — Kristina J Babinski
(74) Attorney, Agent, or Firm — Kevin L. Bray

(57) ABSTRACT

A method of separating a coated substrate includes directing an infrared laser beam onto a first surface of the coated substrate. The coated substrate includes a coating layer disposed on a transparent workpiece, a plurality of defects is disposed within the coated substrate along a contour line that divides a primary region from a dummy region of the coated substrate from a dummy region of the coated substrate. The method also includes translating at least one of the coated substrate and the infrared laser beam relative to each other such that an infrared beam spot traces an oscillating pathway that follows an offset line in a translation direction and oscillates between an inner and outer track line, the oscillating pathway is disposed on the dummy region of the coated substrate, and the infrared laser beam applies thermal energy to the plurality of defects to induce separation of the coated substrate.

19 Claims, 19 Drawing Sheets

(51) Int. Cl.
  *B23K 26/0622* (2014.01)
  *B23K 26/073* (2006.01)
  *B23K 26/082* (2014.01)
  *B23K 26/18* (2006.01)
  *B23K 101/34* (2006.01)
  *B23K 103/00* (2006.01)

(52) U.S. Cl.
  CPC ........ *B23K 26/0734* (2013.01); *B23K 26/082* (2015.10); *B23K 26/18* (2013.01); *B23K 2101/34* (2018.08); *B23K 2103/54* (2018.08)

(56) References Cited

U.S. PATENT DOCUMENTS

| | | | |
|---|---|---|---|
| 2017/0100801 A1* | 4/2017 | Becker | C03B 33/074 |
| 2017/0252859 A1* | 9/2017 | Kumkar | B23K 26/06 |
| 2018/0093914 A1* | 4/2018 | Akarapu | B23K 26/0608 |
| 2018/0236608 A1* | 8/2018 | Okuma | B23K 26/06 |
| 2018/0354070 A1* | 12/2018 | Nogami | B23K 26/0884 |
| 2019/0300417 A1 | 10/2019 | Stute | |
| 2020/0331793 A1 | 10/2020 | Akarapu et al. | |

FOREIGN PATENT DOCUMENTS

| | | | |
|---|---|---|---|
| JP | 2007175887 A | * | 7/2007 |
| KR | 20180114913 | * | 10/2018 |

* cited by examiner

METHODS FOR LASER PROCESSING COATED SUBSTRATES USING A TOP-HAT ENERGY DISTRIBUTION

This application claims priority under 35 USC § 119(e) from U.S. Provisional Patent Application Ser. No. 63/037,126 filed on Jun. 10, 2020 which is incorporated by reference herein in its entirety.

BACKGROUND

Field

The present specification generally relates to apparatuses and methods for laser processing coated substrates.

Technical Background

Advancements in precision micromachining and related process improvements made to reduce size, weight and material costs have facilitated fast pace growth of products such as, but not limited to, flat panel displays for touch screens, tablets, smartphones and televisions. As a result of these advancements, ultrafast industrial lasers have become important tools for applications requiring high precision micromachining. Laser cutting processes utilizing such lasers are expected to separate substrates in a controllable fashion, to form negligible debris and to cause minimal defects and low subsurface damage to the substrate. Coatings on surfaces of substrates can reduce the effectiveness of laser cutting processes. For example, a coating may absorb some of a laser beam, altering propagation of the laser beam to an interior portion of the substrate. Additionally, separation of the coated substrate may form unacceptable amounts of debris, and also may cause defects or subsurface damage to the separated portions of the substrate.

Accordingly, a need exists for alternative improved methods for separating coated substrates.

SUMMARY

According to a first aspect of the present disclosure, a method of separating a coated substrate includes directing an infrared laser beam onto a first surface of the coated substrate. The coated substrate includes a coating layer disposed on a transparent workpiece, a plurality of defects is disposed within the coated substrate, extending into both the coating layer and the transparent workpiece and disposed along a contour line that divides a primary region of the coated substrate from a dummy region of the coated substrate, and the infrared laser beam projects an infrared beam spot onto the first surface of the coated substrate. The method also includes translating at least one of the coated substrate and the infrared laser beam relative to each other such that the infrared beam spot traces an oscillating pathway. The oscillating pathway follows an offset line in a translation direction and oscillates between an inner track line and an outer track line, the oscillating pathway is disposed on the dummy region of the coated substrate, and the infrared laser beam applies thermal energy to the plurality of defects disposed in the coated substrate and inducing separation of the coated substrate along the contour line.

A second aspect of the present disclosure includes the method of the first aspect, wherein when tracing the oscillating pathway, the infrared beam spot applies thermal energy to the dummy region of the coated substrate without melting or ablating the coating layer of the primary region of the coated substrate.

A third aspect of the present disclosure includes the method of the first aspect or the second aspect, wherein the infrared beam spot has a Gaussian energy distribution.

A fourth aspect of the present disclosure includes the method of any of the previous aspects, wherein the oscillating pathway follows a linear oscillation in which the oscillating pathway oscillates along a transverse axis that is orthogonal to the offset line and the offset line is parallel to and offset from the contour line.

A fifth aspect of the present disclosure includes the method of the fifth aspect, wherein the oscillating pathway has a plurality of straight portions and a plurality of rounded portions, each of the plurality of straight portions extends along the transverse axis between the plurality of rounded portions and each of the plurality of straight portions have a length of from 0.5 mm to 1.5 mm, and each of the plurality of rounded portions have a radius of curvature of from 0.5 mm to 1.5 mm.

A sixth aspect of the present disclosure includes the method of any of the first aspect through the third aspect, wherein the oscillating pathway follows a wobbling oscillation in which the oscillating pathway rotationally oscillates between the inner track line and the outer track line while following the offset line in the translation direction.

A seventh aspect of the present disclosure includes the method of any of the first aspect through the third aspect, wherein the oscillating pathway is a sawtooth pathway having angular turns at or between the inner track line and the outer track line while following the offset line in the translation direction.

An eighth aspect of the present disclosure includes the method of any of the previous aspects, wherein the offset line is spaced a distance of from 1 mm to 2 mm from the contour line, the inner track line is spaced a distance of from 0.5 mm to 1.5 mm from the contour line, and the outer track line is spaced a distance of from 1.5 mm to 2.5 mm from the contour line.

A ninth aspect of the present disclosure includes the method of any of the previous aspects, wherein the infrared laser beam is generated by an infrared beam source and the infrared beam source is coupled to a scanner configured to translate the infrared laser beam such that the infrared beam spot traces the oscillating pathway.

A tenth aspect of the present disclosure includes the method of any of the previous aspects, wherein the infrared laser beam has a $1/e^2$ diameter in a range of from 600 μm to 900 μm.

An eleventh aspect of the present disclosure includes the method of any of the previous aspects, wherein the coating layer is a polymer or a metal oxide.

A twelfth aspect of the present disclosure includes the method of any of the previous aspects, wherein the transparent workpiece comprises borosilicate glass, soda-lime glass, aluminosilicate glass, alkali aluminosilicate glass, alkaline earth aluminosilicate glass, alkaline earth boroaluminosilicate glass, fused silica, sapphire, silicon, or gallium arsenide.

A thirteenth aspect of the present disclosure includes the method of any of the previous aspects, further including, prior to directing the infrared laser beam onto the first surface the coated substrate, forming the plurality of defects in the coated substrate.

A fourteenth aspect of the present disclosure includes the method of the thirteenth aspect, wherein forming the plurality of defects includes directing a pulsed laser beam into the coated substrate. The pulsed laser beam forms a pulsed laser beam focal line extending into the coating layer and the transparent workpiece, the pulsed laser beam focal line inducing absorption in the coating layer and the transparent workpiece, the induced absorption producing an individual defect in the coated substrate and the pulsed laser beam focal line includes a wavelength λ, a spot size $w_o$, and a Rayleigh range $Z_R$ that is greater than $$F_D \frac{\pi w_o^2}{\lambda},$$

where $F_D$ is a dimensionless divergence factor comprising a value of 10 or greater. The method further includes translating at least one of the coated substrate and the pulsed laser beam relative to each other along the contour line to form the plurality of defects in the coated substrate.

A fifteenth aspect of the present disclosure includes the method of the fourteenth aspect, wherein the coating layer includes a transmission of greater than 70% per mm of material depth of the wavelength λ of the pulsed laser beam focal line.

A sixteenth aspect of the present disclosure includes the method of the fourteenth aspect or the fifteenth aspect, wherein a spacing between adjacent defects of the plurality of defects is about 35 μm or less, each pulse burst of the pulsed laser beam has a pulse burst energy of greater than 500 μJ, and the dimensionless divergence factor $F_D$ has a value of from 100 to 2000.

A seventeenth aspect of the present disclosure includes the method of the fourteenth aspect or the fifteenth aspect, wherein the pulsed laser beam traverses an aspheric optical element before irradiating the coated substrate.

According to an eighteenth aspect of the present disclosure, a method of separating a coated substrate includes directing an infrared laser beam onto a first surface of the coated substrate. The coated substrate includes a coating layer disposed on a transparent workpiece, a plurality of defects is disposed within the coated substrate, extending into both the coating layer and the transparent workpiece and disposed along a contour line that divides a primary region of the coated substrate from a dummy region of the coated substrate, the infrared laser beam projects an infrared beam spot onto the first surface of the coated substrate, and the infrared beam spot includes an energy distribution in which 20% or less of a total energy of the infrared beam spot has a fluence less than 80% of a maximum fluence of the infrared beam spot. The method also includes translating at least one of the coated substrate and the infrared laser beam relative to each other such that the infrared beam spot follows an offset line, wherein the offset line is disposed on the dummy region of the coated substrate and is offset from the contour line such that the inner region of the infrared beam spot is projected onto the dummy region and the infrared laser beam applies thermal energy to the plurality of defects disposed in the coated substrate and inducing separation of the coated substrate along the contour line.

A nineteenth aspect of the present disclosure includes the method of the eighteenth aspect, wherein when following the offset line, the infrared beam spot applies thermal energy to the dummy region of the coated substrate without melting or ablating the coating layer of the primary region of the coated substrate.

A twentieth aspect of the present disclosure includes the method of the eighteenth aspect or the nineteenth aspect, wherein at least one of the coated substrate and the infrared laser beam are translated relative to each other such that the infrared beam spot traces an oscillating pathway that follows the offset line in a translation direction and oscillates between an inner track line and an outer track line and the oscillating pathway is disposed on the dummy region of the coated substrate.

A twenty-first aspect of the present disclosure includes the method of any of the eighteenth through twentieth aspects, wherein the entirety of the inner region of the infrared beam spot is projected onto the dummy region of the coated substrate.

A twenty-second aspect of the present disclosure includes the method of any of the eighteenth through twenty-first aspects, wherein the infrared laser beam traverses a diffractive optical element before irradiating the coated substrate.

A twenty-third aspect of the present disclosure includes the method of any of the eighteenth through twenty-second aspects, wherein 10% or less of the total energy of the infrared beam spot has less than 80% of the maximum fluence of the infrared beam spot.

A twenty-fourth aspect of the present disclosure includes the method of any of the eighteenth through twenty-third aspects, wherein 5% or less of the total energy of the infrared beam spot has less than 90% of the maximum fluence of the infrared beam spot.

A twenty-fifth aspect of the present disclosure includes the method of any of the eighteenth through twenty-fourth aspects, wherein the offset line is parallel to the contour line.

A twenty-sixth aspect of the present disclosure includes the method of any of the eighteenth through twenty-fifth aspects, wherein the coating layer is a polymer or a metal oxide.

A twenty-seventh aspect of the present disclosure includes the method of any of the eighteenth through twenty-sixth aspects, wherein the transparent workpiece is borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

A twenty-eighth aspect of the present disclosure includes the method of any of the eighteenth through twenty-seventh aspects, further including, prior to directing the infrared laser beam onto the first surface the coated substrate, forming the plurality of defects in the coated substrate.

A twenty-ninth aspect of the present disclosure includes the method of the twenty-eighth aspect, further including, wherein forming the plurality of defects includes directing a pulsed laser beam into the coated substrate, wherein the pulsed laser beam forms a pulsed laser beam focal line extending into the coating layer and the transparent workpiece, the pulsed laser beam focal line inducing absorption in the coating layer and the transparent workpiece, the induced absorption producing an individual defect in the coated substrate. The pulsed laser beam focal line includes a wavelength λ, a spot size $w_o$, and a Rayleigh range $Z_R$ that is greater than $$F_D \frac{\pi w_o^2}{\lambda},$$

where $F_D$ is a dimensionless divergence factor comprising a value of 10 or greater. The method also includes translating at least one of the coated substrate and the pulsed laser beam relative to each other along the contour line to form the plurality of defects in the coating layer.

A thirtieth aspect of the present disclosure includes the method of the twenty-ninth aspect, wherein the coating layer includes a transmission of greater than 70% per mm of material depth of the wavelength λ of the pulsed laser beam focal line.

According to a thirty-first aspect of the present disclosure, a method of separating a coated substrate includes directing an infrared laser beam onto a first surface of the coated substrate. The coated substrate includes a coating layer disposed on a transparent workpiece, a plurality of defects is disposed within the coated substrate, extending into both the coating layer and the transparent workpiece and disposed along a contour line that divides a primary region of the coated substrate from a dummy region of the coated substrate, and the infrared laser beam projects an infrared beam spot onto the first surface of the coated substrate. The infrared beam spot comprises includes annular shape. The method also includes translating at least one of the coated substrate and the infrared laser beam relative to each other such that the infrared beam spot follows an offset line, wherein the offset line is disposed on the dummy region of the coated substrate and is offset from the contour line such that the infrared beam spot is projected onto the dummy region and the infrared laser beam applies thermal energy to the coated substrate thereby inducing separation of the coated substrate along the contour line.

A thirty-second aspect of the present disclosure includes the method of the thirty-first aspect, wherein when following the offset line, the infrared beam spot applies thermal energy to the dummy region of the coated substrate without melting or ablating the coating layer of the primary region of the coated substrate.

A thirty-third aspect of the present disclosure includes the method of the thirty-first aspect or the thirty-second aspect, wherein at least one of the coated substrate and the infrared laser beam are translated relative to each other such that the infrared beam spot traces an oscillating pathway that follows the offset line in a translation direction and oscillates between an inner track line and an outer track line and the oscillating pathway is disposed on the dummy region of the coated substrate.

A thirty-fourth aspect of the present disclosure includes the method of any of the thirty-first through thirty-third aspects, wherein the infrared laser beam traverses an aspheric optical element before irradiating the coated substrate.

A thirty-fifth aspect of the present disclosure includes the method of any of the thirty-first through thirty-fourth aspects, wherein the infrared laser beam traverses a focusing lens before irradiating the coated substrate, the focusing lens comprises a focal plane at a focal length from the focusing lens, and the first surface of the coated substrate is positioned relative to the focusing lens such that the focal plane is offset from the first surface of the coated substrate.

A thirty-sixth aspect of the present disclosure includes the method of any of the thirty-first through thirty-fifth aspects, wherein the infrared laser beam comprises a pulsed infrared laser beam and when translating at least one of the coated substrate and the pulsed infrared laser beam relative to each other, the pulsed infrared laser beam impinges the first surface of the coated substrate at impingement locations along the offset line spaced apart a distance of from ¼ a diameter of the infrared beam spot to ½ the diameter of the infrared beam spot.

A thirty-seventh aspect of the present disclosure includes the method of any of the thirty-first through thirty-sixth aspects, further including forming the plurality of defects in the coated substrate prior to directing the infrared laser beam onto the first surface the coated substrate by directing a pulsed laser beam into the coated substrate. The pulsed laser beam forms a pulsed laser beam focal line extending into the coating layer and the transparent workpiece, the pulsed laser beam focal line inducing absorption in the coating layer and the transparent workpiece, the induced absorption producing an individual defect in the coated substrate. The pulsed laser beam focal line includes a wavelength λ a spot size $w_o$, and a Rayleigh range $Z_R$ that is greater than $$F_D \frac{\pi w_o^2}{\lambda},$$

where $F_D$ is a dimensionless divergence factor has a value of 10 or greater. The method further includes translating at least one of the coated substrate and the pulsed laser beam relative to each other along the contour line to form the plurality of defects in the coating layer.

A thirty-eighth aspect of the present disclosure includes the method of the thirty-seventh aspect, wherein the coating layer includes a transmission of greater than 70% per mm of material depth of the wavelength λ of the pulsed laser beam focal line.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
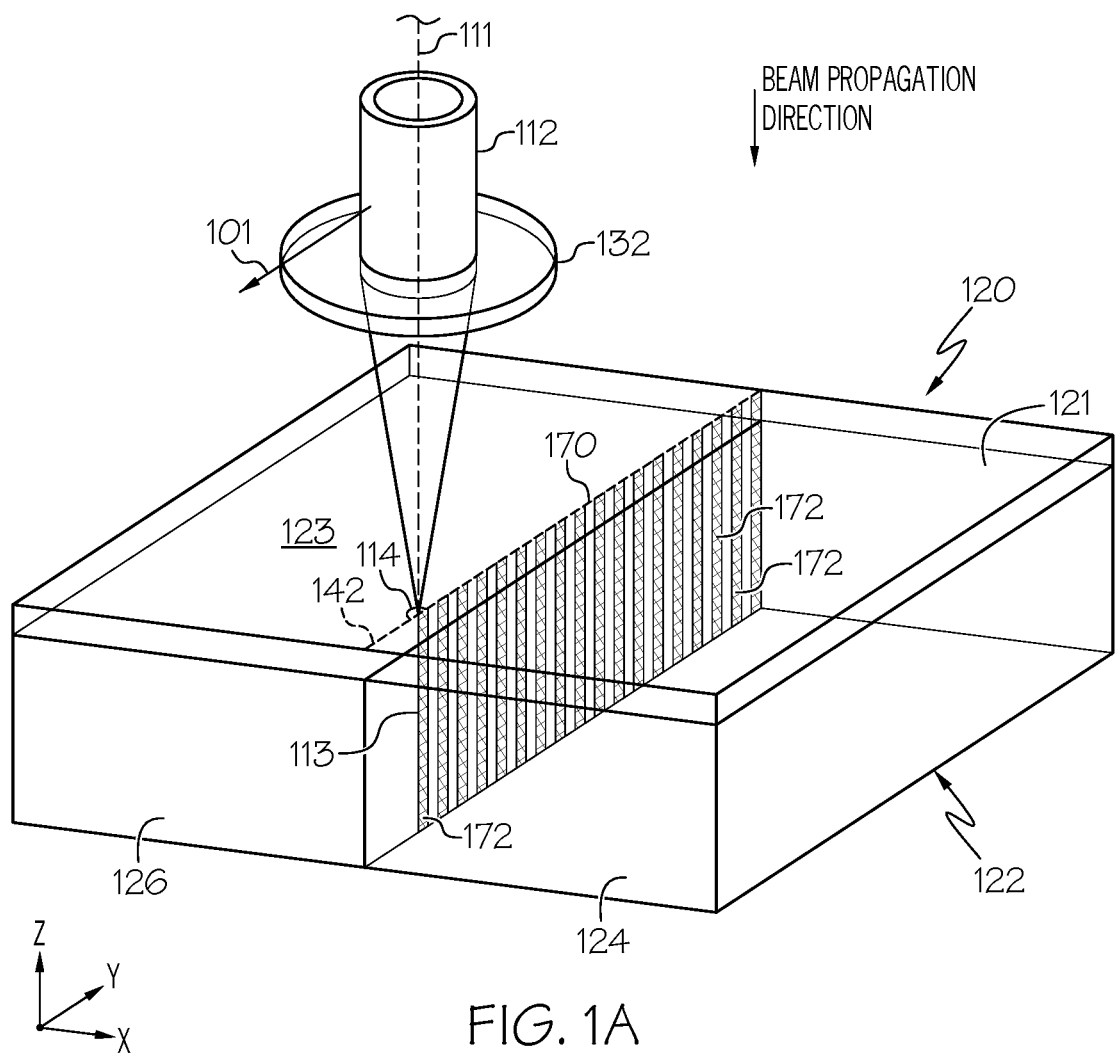
FIG. 1A schematically depicts the formation of a contour of defects in a coated substrate, according to one or more embodiments described herein.

Reference will now be made in detail to embodiments of separating a substrate, such as a coated substrate comprising a transparent workpiece and a coating layer. The coated substrate includes a primary region and a dummy region. The primary region is a portion of the coated substrate that is to be used as a resultant product, such as a screen or other substrate in a consumer electronics product, and the dummy region is a scrap region. Because the primary region is to be used as a product, it is desirable to separate the primary region from the dummy region while limiting or preventing damage to the primary region. The methods described herein include using a pulsed laser beam to form a series of defects in the coated substrate and an infrared laser beam to separate the transparent workpiece and the coating layer along the series of defects, which are formed along a boundary between the primary region and the dummy region.

In particular, the methods described herein direct thermal energy onto the dummy region of the coated substrate using techniques sufficient to both induce separation of the defects disposed in the coated substrate along the boundary between the primary region and the dummy region in a single process step. One method described herein includes translating an infrared laser beam along an oscillating pathway on the dummy region. Another method described herein includes modifying the energy distribution of an infrared laser beam into a top hat energy distribution and directing this modified laser beam onto the dummy region. Yet another method described herein includes forming the infrared laser beam into an annular shape and directing this annular infrared laser beam onto the dummy region. While the methods and systems are primarily described herein with respect to a coated substrate comprising a transparent workpiece and a coating layer, it should be understood that these methods and systems are also applicable to the separation of single substrates, such as uncoated transparent workpieces, which may benefit from the decrease in chipping and heat cracks and thus a higher release speed. Various embodiments of separating a coated substrate using laser processing techniques will be described herein with specific reference to the appended drawings. Whenever possible, the same reference numerals will be used throughout the drawings to refer to the same or like parts.

As used herein, "laser processing" comprises directing a laser beam onto and/or into a substrate, such as a coated substrate comprising a transparent workpiece with a coating layer. In some embodiments, laser processing further comprises translating the laser beam relative to the coated substrate, for example, along a contour line or other pathway. Examples of laser processing include using a laser beam to form a contour comprising a series of defects that extend into the transparent workpiece and using an infrared laser beam to heat both the transparent workpiece and the coating layer. Laser processing may separate the coated substrate along one or more desired lines of separation.

As used herein, "beam spot" refers to a cross section of a laser beam (e.g., a beam cross section) at the impingement location of the laser beam at an impingement surface of a substrate (e.g., the coated substrate). The impingement surface is the surface of a coated substrate upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "pulsed laser beam focal line," refers to a pattern of interacting (e.g., crossing) light rays of a pulsed laser beam that forms a focal region elongated in the beam propagation direction. In conventional laser processing, a pulsed laser beam is tightly focused to a focal point. The focal point is the point of maximum intensity of the pulsed laser beam and is situated at a focal plane in a substrate, such as the transparent workpiece. In the elongated focal region of a pulsed laser beam focal line, in contrast, the region of maximum intensity of the pulsed laser beam extends beyond a point to a line aligned with the beam propagation direction. A pulsed laser beam focal line is formed by converging light rays of a pulsed laser beam that intersect (e.g., cross) to form a continuous series of focal points aligned with the beam propagation direction. The pulsed laser beam focal lines described herein are formed using a quasi-non-diffracting beam, mathematically defined in detail below.

As used herein, "contour line," corresponds to the set of intersection points of the laser beam with the incident surface of a substrate (e.g., the coated substrate) resulting from relative motion of the laser beam and the substrate. A contour line can be a linear, angled, polygonal or curved in shape. A contour line can be closed (i.e. defining an enclosed region on the surface of the substrate) or open (i.e. not defining an enclosed region on the surface of the substrate). The contour line represents a boundary along which separation of the substrate into two or more parts is facilitated. For example, in the embodiments described herein, the contour line represents a boundary between a dummy region of the coated substrate and a primary region of the coated substrate.

As used herein, "contour," refers to a set of defects in a substrate (e.g., in the transparent workpiece of the coated substrate) formed by a laser beam through relative motion of a laser beam and the substrate along a contour line. The defects are spaced apart along the contour line and are wholly contained within the interior of the substrate or extend through one or more surfaces into the interior of the substrate. Defects may also extend through the entire thickness of the substrate. Separation of the substrate (e.g., the transparent workpiece) occurs by connecting defects, such as, for example, through propagation of a crack.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a pulsed laser beam focal line. Defects may also be referred to, in various embodiments herein, as defect lines or damage tracks. A defect or damage track is formed through interaction of a pulsed laser beam focal line with the transparent workpiece. As described more fully below, the pulsed laser beam focal line is produced by a pulsed laser. A defect at a particular location along the contour line is formed from a pulsed laser beam focal line produced by a single laser pulse at the particular location, a pulse burst of sub-pulses at the particular location, or multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning® Gorilla® Glass available from Corning Incorporated of Corning, NY (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ glass available from Corning Incorporated of Corning, NY. Moreover, the transparent workpiece may comprise other components, which are transparent to the wavelength of the laser, for example, glass ceramics or crystals such as sapphire or zinc selenide. Furthermore, in the embodiments described herein, a coating layer is disposed on the transparent workpiece forming a coated substrate.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws, which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+(when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically described below. In particular, the laser beam used to form a contour of defects in the embodiments described herein. The laser beam has an intensity distribution I(X,Y,Z), where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as x, y, and z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams.

Figure 1B:
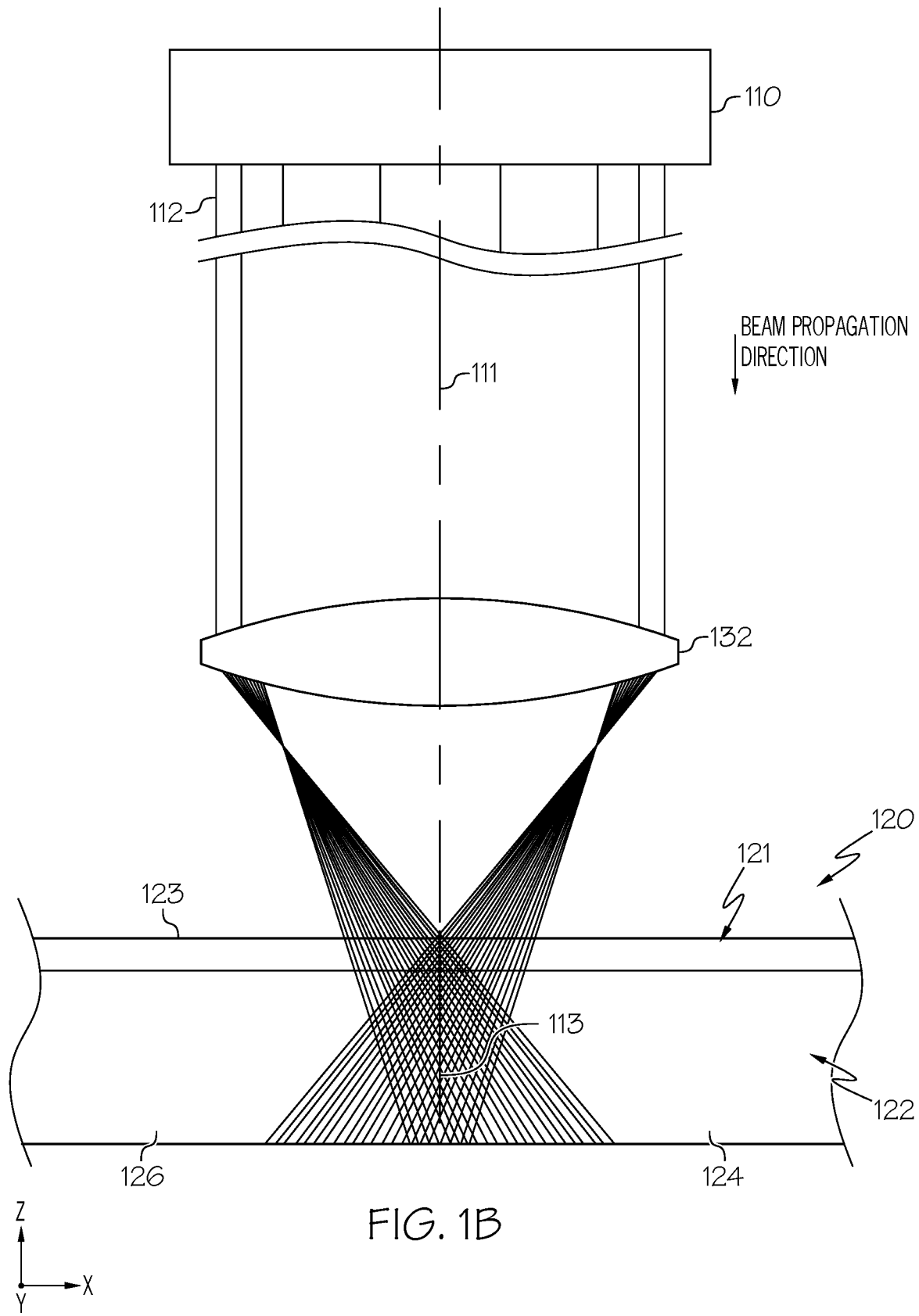
FIG. 1B schematically depicts an example pulsed laser beam focal line during processing of the coated substrate, according to one or more embodiments described herein.
Figure 2:
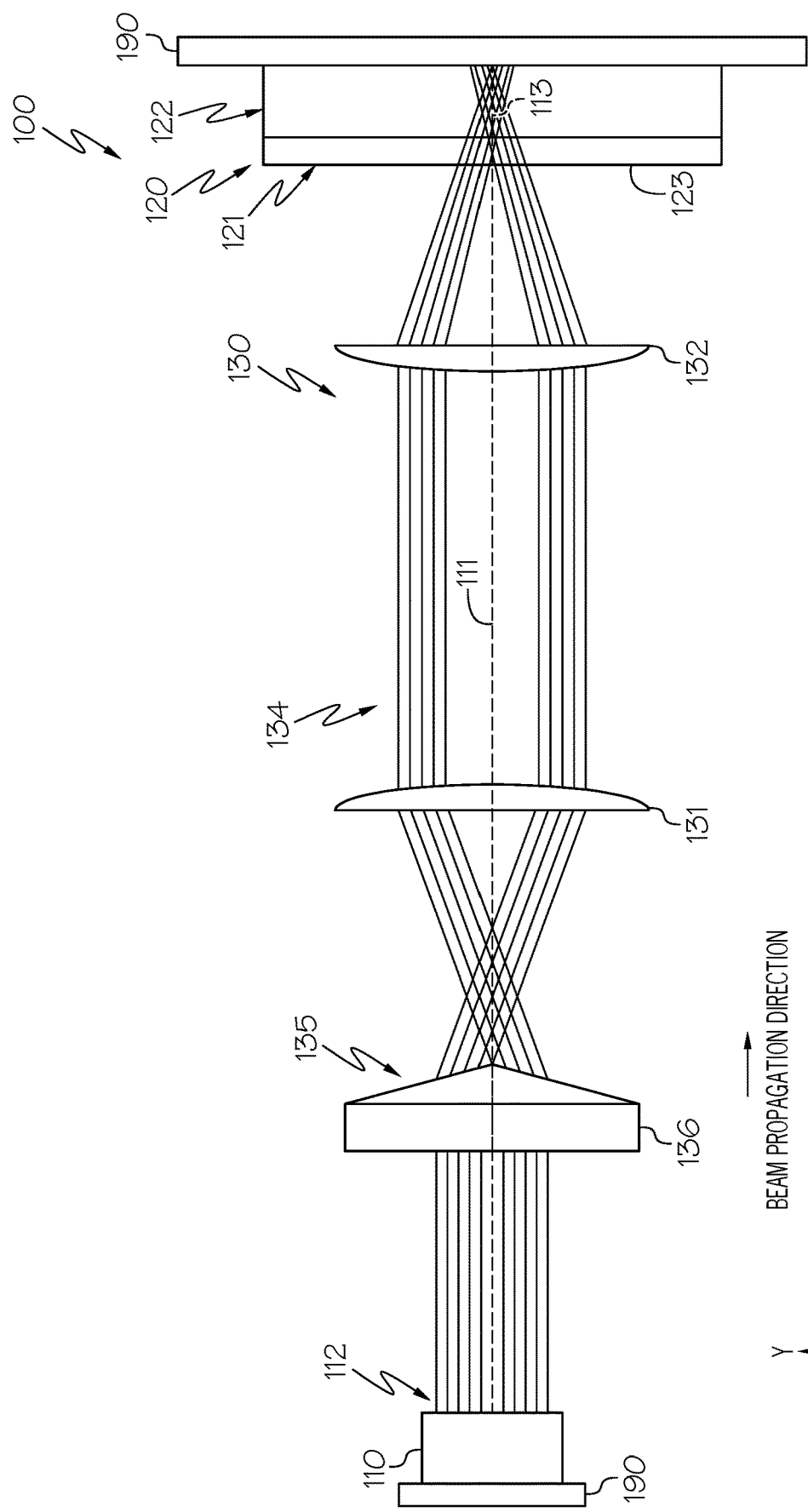
FIG. 2 schematically depicts an optical assembly for laser processing with pulsed laser beam focal lines, according to one or more embodiments described herein.

Referring to FIGS. 1A and 1B and 2, the pulsed laser beam 112 used to form the defects further has an intensity distribution I(X,Y,Z), where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 135, as described in more detail below with respect to the optical assembly 100 depicted in FIG. 2. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the coated substrate 120.

The length of the pulsed laser beam focal line produced from a quasi-non-diffracting beam is determined by the Rayleigh range of the quasi-non-diffracting beam. Particularly, the quasi-non-diffracting beam defines a pulsed laser beam focal line 113 having a first end point and a second end point each defined by locations where the quasi-non-diffracting beam has propagated a distance from the beam waist equal to a Rayleigh range of the quasi-non-diffracting beam. The length of the laser beam focal line corresponds to twice the Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. Provisional Application Ser. No. 62/402,337 and Dutch Patent Application No. 2017998, which are incorporated by reference in their entireties.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form a contour of defects because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances (low Rayleigh range). To achieve low divergence (high Rayleigh range), it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range $Z_R$ based on the effective spot size $w_{o,eff}$ for axisymmetric beams can be specified as non-diffracting or quasi-non-diffracting beams for forming damage regions in Equation (1), below:

$$Z_R > F_D \frac{\pi w_{0,eff}^2}{\lambda} \quad (1)$$

where $F_D$ is a dimensionless divergence factor having a value of at least 10, in an embodiment at least 50, in an embodiment at least 100, in an embodiment at least 250, in particular at least 500 and in another embodiment at least 1000. In a further embodiment $F_D$ can be in the range from 10 to 2000, in particular in the range from 50 to 1500 and furthermore in particular in the range from 100 to 1000. For a non-diffracting or quasi-non-diffracting beam the distance (Rayleigh range), $Z_R$ in Equation (1), over which the effective spot size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (1) with a value of $F_D \geq 10$. As the value of $F_D$ increases, the pulsed laser beam 112 approaches a more nearly perfectly non-diffracting state. Thus, as the value of $F_D$ increases, the length of the laser beam focal line increases, facilitating the formation of longer defects.

Additional information about Rayleigh range, beam divergence, intensity distribution, axisymmetric and non-axisymmetric beams, and spot size as used herein can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

Referring now to FIGS. 1A and 1B, a coated substrate 120 comprising a transparent workpiece 122 and a coating layer 121 disposed on the transparent workpiece 122 is schematically depicted undergoing laser processing according to the methods described herein. In particular, FIGS. 1A and 1B schematically depict directing a pulsed laser beam 112 that is output by a pulsed beam source 110, such as a Gaussian pulsed beam source, and oriented along a beam pathway 111 into the coated substrate 120 to form a defect 172 in the coated substrate 120, for example, extending into both the coating layer 121 and the transparent workpiece 122. The pulsed laser beam 112 propagates along the beam pathway 111 and is oriented such that the pulsed laser beam 112 may be focused into a pulsed laser beam focal line 113 within the coated substrate 120, for example, using an aspheric optical element 135 and one or more lenses (FIG. 2). The pulsed laser beam focal line 113 generates an induced absorption within the transparent workpiece 122 and, in some embodiments, the coating layer 121, to produce the defect 172 within the coated substrate 120 that may extend into both the coating layer 121 and the transparent workpiece 122. Furthermore, a contour 170 of defects 172 may be formed in the coated substrate 120 by translating at least one of the pulsed laser beam 112 and the coated substrate 120 relative to one another such that the pulsed laser beam 112 translates relative to the coated substrate 120 in a translation direction 101.

As also shown in FIG. 1A, the pulsed laser beam 112 forms a beam spot 114 projected onto a first surface 123 of the coated substrate 120. In FIG. 1A, the first surface 123 is a surface of the coating layer 121. The coating layer 121 may comprise any material comprising a transmission of greater than 70% per mm of material depth of the wavelength λ of the pulsed laser beam 112. Without intending to be limited by theory, transmission losses are due to scattering or absorption and minimizing transmission losses minimizes disruption of the formation of the pulsed laser beam focal line 113 in the coating layer 121 and the transparent workpiece 122. In some embodiments, the transmission is greater than 90% per mm of material depth, such as greater than 95% per mm of material depth. In addition, material of the coating layer 121 has a homogenous phase alteration (e.g., a phase alteration caused by refractive index). Without intending to be limited by theory, any step in phase alteration will result in a loss of focus on a one digit μm scale. Indeed, inhomogeneous alteration of the phase or direction of the light causes scattering, which reduces transmission. While the coating layer 121 may comprise any material having a transmission of greater than 70% per mm of material depth of the wavelength λ of the pulsed laser beam 112, example materials include a metal oxide and a polymer.

Referring also to FIG. 2, the pulsed laser beam 112 may be focused into the pulsed laser beam focal line 113 using a lens 132, which is the final focusing element in an optical assembly 100. While a single lens 132 is depicted in FIGS. 1A and 1B, the optical assembly 100 further comprises an aspheric optical element 135, which modifies the pulsed laser beam 112 such that the pulsed laser beam 112 has a quasi-non-diffracting character downstream the aspheric optical element 135. Thus, when the portion of the pulsed laser beam 112 shown in FIGS. 1A and 1B impinges the lens 132, the pulsed laser beam 112 has a quasi-non-diffracting character. Furthermore, some embodiments may include a lens assembly 130 including, for example a first lens 131 and a second lens 132, and repetitions thereof (FIG. 2) to focus the pulsed laser beam 112 into the pulsed laser beam focal line 113. Other standard optical elements (e.g. prisms, beam splitters etc.) may also be included in lens assembly 130.

As depicted in FIG. 1A, the pulsed laser beam 112 may comprise an annular shape when impinging the lens 132. While the lens 132 is depicted focusing the pulsed laser beam 112 into the pulsed laser beam focal line 113 in FIG. 1A, other embodiments may use the aspheric optical element 135 (FIG. 2), which modifies the pulsed laser beam 112 such that the pulsed laser beam 112 has a quasi-non-diffracting character downstream the aspheric optical element 135, to also focus the pulsed laser beam 112 into the pulsed laser beam focal line 113. In other words, in some embodiments, the lens 132 may be the final focusing element and in other embodiments, the aspheric optical element 135 may be the final focusing element. The pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. The length of the pulsed laser beam focal line 113 may be selected based on the particular laser processing goals. As one example, for thicker coated substrates 120 it may be advantageous to form longer pulsed laser beam focal lines 113. As another example, if defects 172 extending into only discrete depth sections of the coated substrate 120 is desired, it may be advantageous to form shorter pulsed laser beam focal lines 113.

Referring now to FIG. 2, the optical assembly 100 for producing a pulsed laser beam 112 that is quasi-non-diffracting and forms the pulsed laser beam focal line 113 at the coated substrate 120 inclusive of the coating layer 121 and transparent workpiece 122 using the aspheric optical element 135 (e.g., an axicon 136) is schematically depicted. The optical assembly 100 includes a pulsed beam source 110 that outputs the pulsed laser beam 112, and the lens assembly 130 comprising the first lens 131 and the second lens 132. The coated substrate 120 may be positioned such that the pulsed laser beam 112 output by the pulsed beam source 110 irradiates the coating layer 121 and transparent workpiece 122, for example, after traversing the aspheric optical element 135 and thereafter, both the first lens 131 and the second lens 132.

The aspheric optical element 135 is positioned within the beam pathway 111 between the pulsed beam source 110 and the coated substrate 120. In operation, propagating the pulsed laser beam 112, e.g., an incoming Gaussian beam, through the aspheric optical element 135 may alter, for example, phase alter, the pulsed laser beam 112 such that the portion of the pulsed laser beam 112 propagating beyond the aspheric optical element 135 is quasi-non-diffracting, as described above. The aspheric optical element 135 may comprise any optical element comprising an aspherical shape. In some embodiments, the aspheric optical element 135 may comprise a conical wavefront producing optical element, such as an axicon lens, for example, a negative refractive axicon lens (e.g., negative axicon), a positive refractive axicon lens, a reflective axicon lens, a diffractive axicon lens, a phase axicon, a diffractive optic, a cubically shaped optical element, or the like.

While the optical assembly 100 is primarily described as altering the pulsed laser beam 112 into a quasi-non-diffracting beam using the aspheric optical element 135, it should be understood that a quasi-non-diffracting beam also be formed by other phase-altering optical elements, such as a spatial light modulator, an adaptive phase plate, a static phase plate, a deformable mirror, diffractive optical grating, or the like. Each of these phase-altering optical elements, including the aspheric optical element 135, modify the phase of the pulsed laser beam 112, to reduce beam divergence, increase Rayleigh range, and form a quasi-non-diffracting beam as mathematically defined above.

Referring still to FIG. 2, the lens assembly 130 comprises two lenses, with the first lens 131 positioned upstream the second lens 132. The first lens 131 may collimate the pulsed laser beam 112 within a collimation space 134 between the first lens 131 and the second lens 132. Further, the most downstream positioned second lens 132 of the lens assembly 130 may focus the pulsed laser beam 112 into the transparent workpiece 122. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise a collimating lens and the second lens 132 may comprise a meniscus lens, an asphere, or another higher-order corrected focusing lens. In operation, the lens assembly 130 may control the position of the pulsed laser beam focal line 113 along the beam pathway 111. In further embodiments, the lens assembly 130 may comprise an 8F lens assembly, a 4F lens assembly comprising a single set of first and second lenses 131, 132, or any other known or yet to be developed lens assembly 130 for focusing the pulsed laser beam 112 into the pulsed laser beam focal line 113. Moreover, it should be understood that some embodiments may not include the lens assembly 130 and instead, the aspheric optical element 135 may focus the pulsed laser beam 112 into the pulsed laser beam focal line 113. For example, aspheric optical element 135 may both transform pulsed laser beam 112 into a quasi-non-diffracting laser beam and focus the quasi-non-diffracting laser beam into pulsed laser beam focal line 113.

Referring again to FIGS. 1A-2, the pulsed beam source 110 is configured to output pulsed laser beam 112. In operation, the defects 172 of the contour 170 are produced by interaction of the transparent workpiece 122 with the pulsed laser beam 112 output by the pulsed beam source 110 as modified by the aspheric optical element 135 and/or lens assembly 130. In operation, the pulsed laser beam 112 output by the pulsed beam source 110 may create multi-photon absorption (MPA) in the transparent workpiece 122. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

In some embodiments, the pulsed beam source 110 may output a pulsed laser beam 112 comprising a wavelength of, for example, 1064 nm, 1030 nm, 532 nm, 530 nm, 355 nm, 343 nm, or 266 nm, or 215 nm. Further, the pulsed laser beam 112 used to form defects 172 in the transparent workpiece 122 may be well suited for materials that are transparent to the selected pulsed laser wavelength. Suitable laser wavelengths for forming defects 172 are wavelengths at which the combined losses of linear absorption and scattering by the transparent workpiece 122 are sufficiently low. In embodiments, the combined losses due to linear absorption and scattering by the transparent workpiece 122 and the coating layer 121 at the laser wavelength are less than 20%/mm, or less than 15%/mm, or less than 10%/mm, or less than 5%/mm, or less than 1%/mm, such as 0.5%/mm to 20%/mm, 1%/mm to 10%/mm, or 1%/mm to 5%/mm, for example, 1%/mm, 2.5%/mm, 5%/mm, 10%/mm, 15%/mm, or any range having any two of these values as endpoints, or any open-ended range having any of these values as a lower bound. As used herein, the dimension "/mm" means per millimeter of distance within the transparent workpiece 122 in the beam propagation direction of the pulsed laser beam 112 (i.e., the Z direction). Representative laser wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other laser wavelengths in the ultraviolet, visible, and infrared portions of the spectrum that satisfy the combined linear absorption and scattering loss requirement for a given substrate material can also be used.

Referring still to FIGS. 1A-2, in operation, the contour 170 may be formed in the coated substrate 120 by irradiating a contour line 142 with the pulsed laser beam 112 and translating at least one of the pulsed laser beam 112 and the coated substrate 120 relative to each other along the contour line 142 in the translation direction 101 to form the defects 172 of the contour 170. While the contour 170 depicted in FIG. 1A is linear, it should be understood that the contour 170 may be non-linear, for example, curved. Further, in some embodiments, the contour 170 may be a closed contour, such as a circle, rectangles, ellipses, squares, hexagons, ovals, regular geometric shapes, irregular shapes, polygonal shapes, arbitrary shapes, and the like. The contour line 142 represents a boundary between a primary region 124 and a dummy region 126 of the coated substrate 120. The primary region 124 is the region of the coated substrate 120 that is to be used as a resultant product and the dummy region 126 is a scrap region.

Directing or localizing the pulsed laser beam 112 into the coated substrate 120 generates an induced absorption (e.g., MPA) within the coating layer 121, the transparent workpiece 122, or both (depending on whether the pulsed laser beam focal line 113 extends into the coating layer 121, the transparent workpiece 122, or both) deposits enough energy to break chemical bonds in the coating layer 121 and/or the transparent workpiece 122 at spaced locations along the contour line 142 to form the defects 172. According to one or more embodiments, the pulsed laser beam 112 may be translated across the coated substrate 120 by motion of the coated substrate 120 (e.g., motion of a translation stage 190 coupled to the coated substrate 120), motion of the pulsed laser beam 112 (e.g., motion of the pulsed laser beam focal line 113), or motion of both the coated substrate 120 and the pulsed laser beam focal line 113. By translating at least one of the pulsed laser beam focal line 113 relative to the coated substrate 120, the plurality of defects 172 may be formed in the coated substrate 120.

In some embodiments, the defects 172 may generally be spaced apart from one another by a distance along the contour 170 of from 0.1 μm to 500 μm, such as, 1 μm to 200 μm, 2 μm to 100 μm, or 5 μm to 20 μm, 0.1 μm to 50 μm, 5 μm to 15 μm, 5 μm to 12 μm, 7 μm to 15 μm, 8 μm to 15 μm, or 8 μm to 12 μm, such as 50 μm or less, 45 μm or less, 40 μm or less, 35 μm or less, 30 μm or less, 25 μm or less, 20 μm or less, 15 μm or less, 10 μm or less, such as 100 μm, 75 μm, 50 μm, 40 μm, 30 μm, 25 μm, 10 μm, 5 μm, or any range having any two of these values as endpoints, or any open-ended range having any of these values as a lower bound. While not intending to be limited by theory, increasing the spacing distance between adjacent defects 172 may increase the processing speed (i.e., reducing processing time) and decreasing the spacing distance between adjacent defects 172 may reduce the break resistance of the contour 170 of defects 172. Further, the translation of the coated substrate 120 relative to the pulsed laser beam 112 may be performed by moving the coated substrate 120 and/or the pulsed beam source 110 using one or more translation stages 190.

Referring now to FIGS. 1A-3, when the defects 172 of the one or more contours 170 are formed with pulse bursts 50 having at least two sub-pulses 51, the force necessary to separate the coated substrate 120 along contour 170 (i.e. the break resistance) is reduced compared to the break resistance of a contour 170 of the same shape with the same spacing between adjacent defects 172 in an identical coated substrate 120 that is formed using a single pulse laser having the same energy as the combined energies of the sub-pulses of the pulse burst 50. A pulse burst (such as pulse burst 50) is a short and fast grouping of sub-pulses (i.e., a tight cluster of sub-pulses, such as sub-pulses 51) that are emitted by the laser and interact with the material (i.e. MPA in the material of the coating layer 121 and/or the transparent workpiece 122). The use of pulse bursts 50 (as opposed to a single pulse operation) increases the size (e.g., the cross-sectional size) of the defects 172, which facilitates the connection of adjacent defects 172 when separating the coated substrate 120 along the contour 170, thereby minimizing crack formation away from contour 170 in the separated sections of the coated substrate 120.

Referring still to FIGS. 1A-3, in some embodiments, pulses produced by the pulsed beam source 110 are produced in pulse bursts 50 of two sub-pulses 51 or more per pulse burst 50, such as from 2 to 30 sub-pulses 51 per pulse burst 50 or from 5 to 20 sub-pulses 51 per pulse burst 50. Furthermore, the energy required to modify the coating layer 121 and/or the transparent workpiece 122 is the pulse energy, which may be described in terms of pulse burst energy (i.e., the energy contained within a pulse burst 50 where each pulse burst 50 contains a series of sub-pulses 51; that is, the pulse burst energy is the combined energy of all sub-pulses within the pulse burst). The pulse energy (for example, pulse burst energy) may be from 25 μJ to 1000 μJ or 25 μJ to 750 μJ, such as from 100 μJ to 600 μJ, 50 μJ to 500 μJ, or from 50 μJ to 250 μJ, for example, 25 μJ, 50 μJ, 75 μJ, 100 μJ, 200 μJ, 250 μJ, 300 μJ, 400 μJ, 500 μJ, 600 μJ, 750 μJ, or any range having any two of these values as endpoints, or any open-ended range having any of these values as a lower bound.

Figure 3:
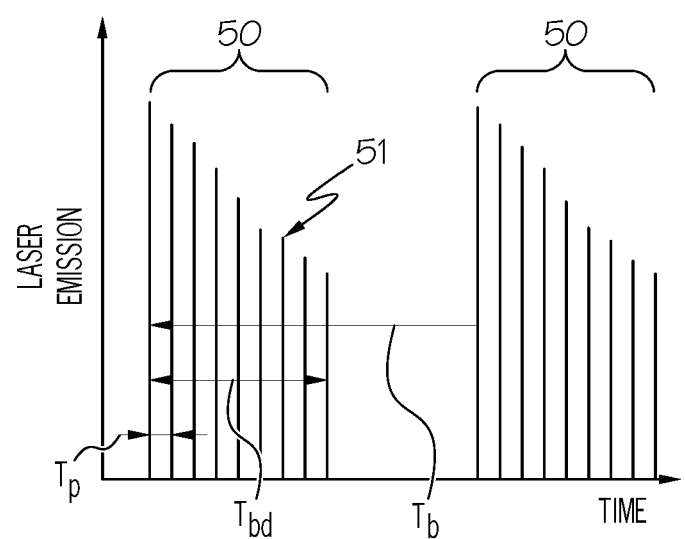
FIG. 3 graphically depicts the relative intensity of laser pulses within an example pulse burst vs. time, according to one or more embodiments described herein.
Figure 4:
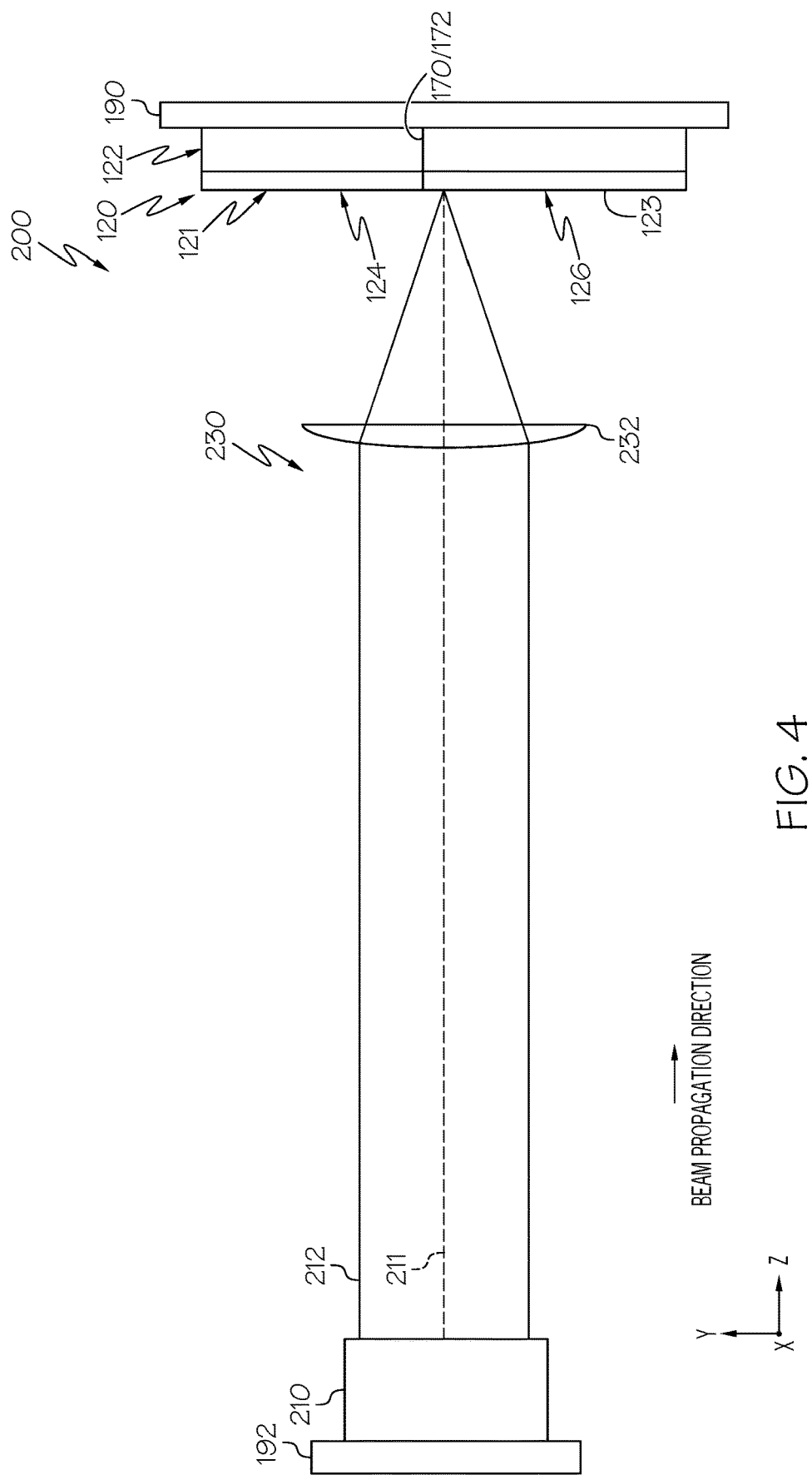
FIG. 4 schematically depicts an optical assembly for laser processing with an infrared laser beam, according to one or more embodiments described herein.
Figure 5A:
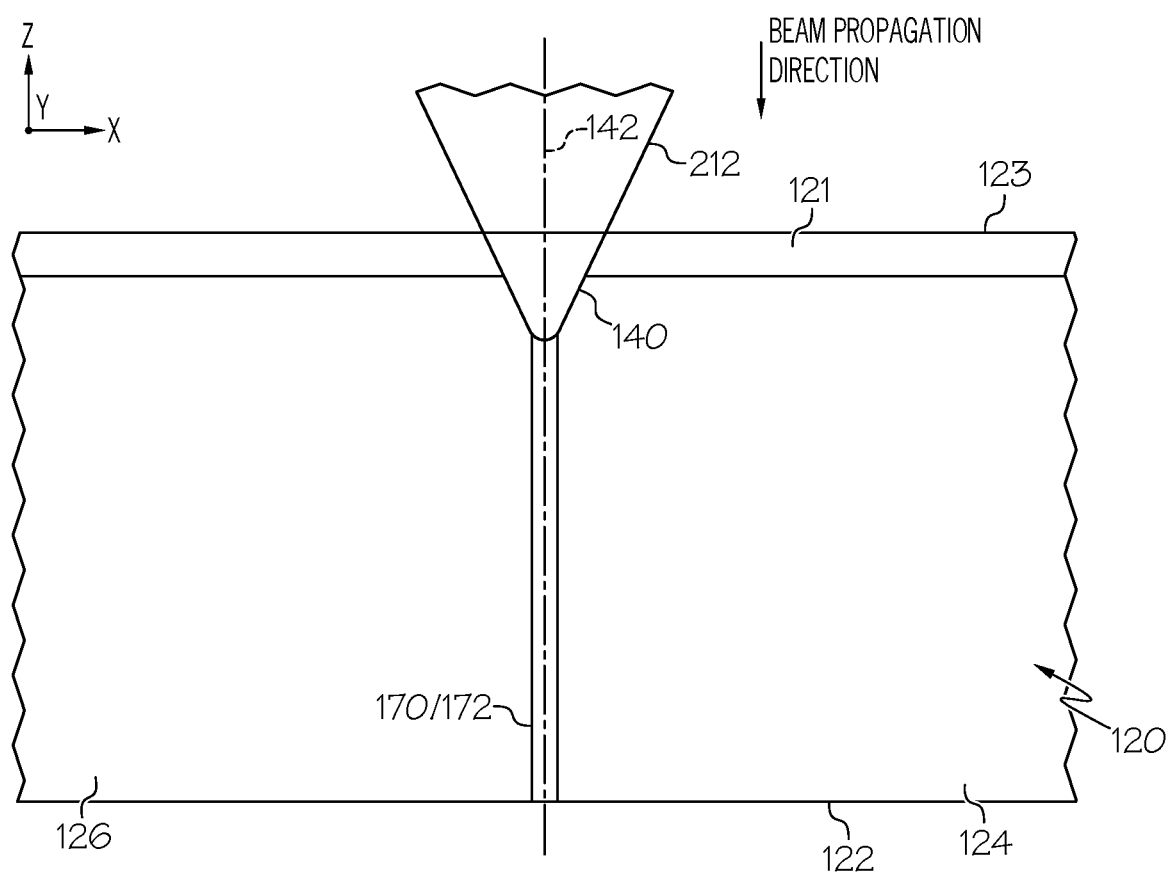
FIG. 5A schematically depicts a cross section of a coated substrate with a laser formed defect during laser processing with an infrared laser beam having a Gaussian intensity profile directed onto the coated substrate in alignment with the defect, according to one or more embodiments shown and described herein.
Figure 5B:
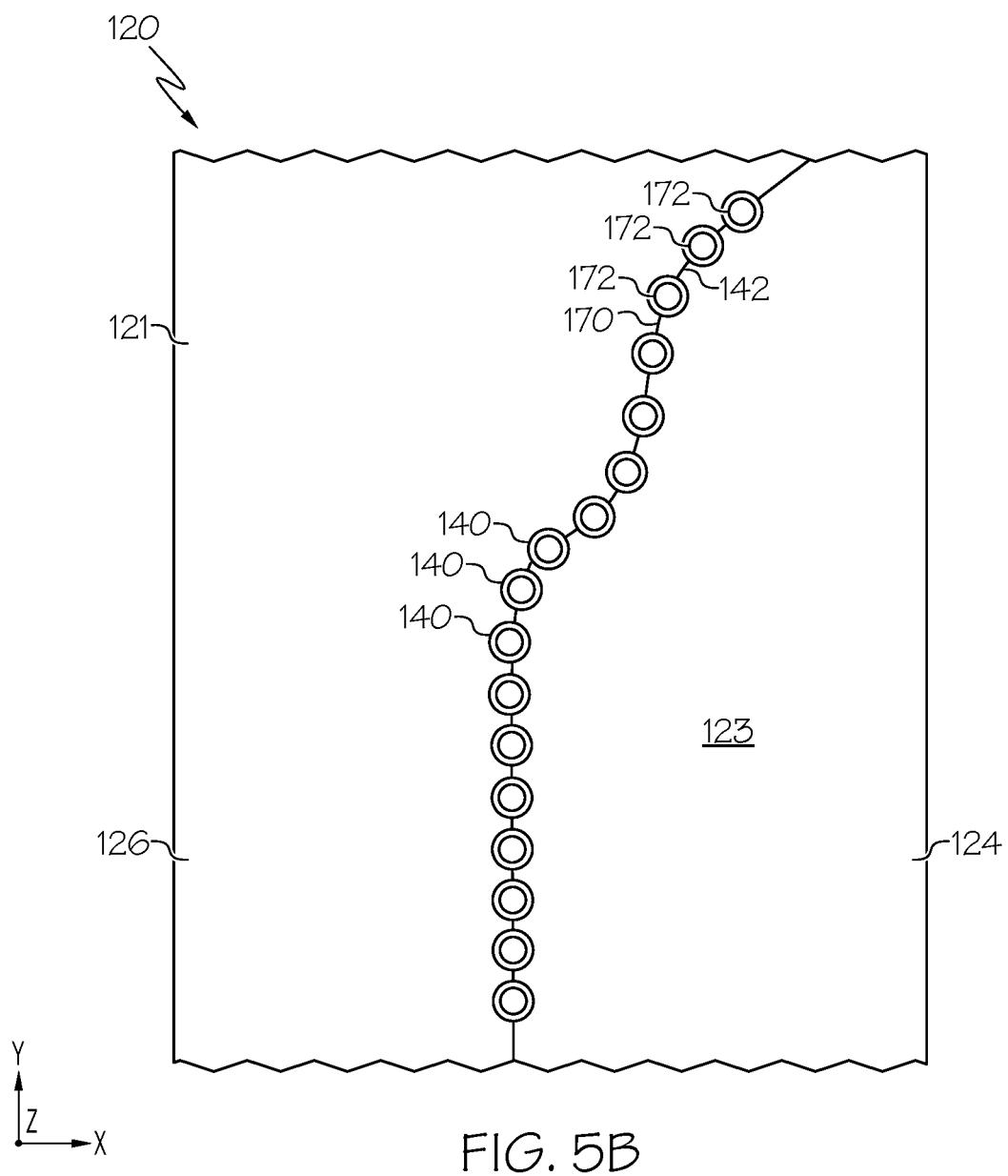
FIG. 5B schematically depicts a top view of the coated substrate of FIG. 5A with a series of defects separated using the laser processing technique shown in FIG. 5A, according to one or more embodiments shown and described herein.

Referring now to FIGS. 4-5B, after forming the contour 170 of defects 172 along the contour line 142 in the coated substrate 120 using, for example, one of the embodiments according FIGS. 1-3, the coated substrate 120 may be further acted upon in a subsequent separating step to induce separation of the transparent workpiece 122 and the coating layer 121 along the contour line 142 (i.e., along the contour 170 of defects 172). The subsequent separating step includes directing an infrared laser beam 212 onto the coated substrate 120 to apply a thermal stress to the coating layer 121 and the transparent workpiece 122. The applied thermal stress induces separation that extends between adjacent defects 172 in the coated substrate 120 along the contour line 142. In the transparent workpiece 122, this separating may include propagation of a crack along the contour line 142.

Without being bound by theory, the infrared laser beam 212 is a controlled heat source that rapidly increases the temperature of the coating layer 121 at or near the contour line 142, modifying material of the coating layer 121 along or near the contour line 142 to induce separation of the material of the coating layer 121 extending between adjacent defects 172. In addition, this rapid heating may build compressive stress in the transparent workpiece 122 on or adjacent to the contour 170. Since the area of the heated surface of transparent workpiece 122 is relatively small and shallow when compared to the overall surface area of the transparent workpiece 122, the heated area cools relatively rapidly. The resultant temperature gradient induces tensile stress in the transparent workpiece 122 sufficient to propagate a crack along the contour 170 and through the depth of the transparent workpiece 122, resulting in full separation of the transparent workpiece 122 along the contour 170. Without being bound by theory, it is believed that the tensile stress may be caused by expansion of the glass (i.e., changed density) in portions of the workpiece with higher local temperature induced by infrared laser beam 212. By inducing separation of both the coating layer 121 and the transparent workpiece 122, the infrared laser beam 212 induces separation of the coated substrate 120 along the contour line 142.

FIG. 4 depicts an optical assembly 200 comprising an infrared beam source 210 configured to generate the infrared laser beam 212. The infrared beam source 210, which may comprise a carbon dioxide laser (a "$CO_2$ laser"), a carbon monoxide laser (a "CO laser"), a solid-state laser, a laser diode, or combinations thereof. The infrared laser beam 212 comprises a wavelength that is readily absorbed by the transparent workpiece 122, for example, a wavelength ranging from 1.2 μm to 13 μm, such as, a range of 4 μm to 12 μm. The power of the infrared laser beam 212 may be from about 10 W to about 4000 W, for example 100 W, 250 W, 500 W, 750 W, 1000 W, or the like. Further, the infrared beam source 210 may comprises a continuous wave laser or a pulsed laser. The optical assembly 200 further comprises a lens assembly 230 that includes a lens 232 for focusing the infrared laser beam 212 onto the coated substrate 120. In operation, the infrared laser beam 212 propagates along an infrared beam pathway 211 and is oriented such that the infrared laser beam 212 may be directed onto the coated substrate 120, for example, focused onto the first surface 123 of the coated substrate 120 using the lens 232.

Referring now to FIG. 5A, a cross section of the coated substrate 120 with a contour 170 of defects 172 during laser processing with the infrared laser beam 212 is schematically depicted. In FIG. 5A, the infrared laser beam 212 is directed onto the coated substrate 120 using the optical assembly 200 of FIG. 4 and comprises a Gaussian intensity profile at the coated substrate 120. In addition, in FIG. 5A, the infrared laser beam 212 is directed onto the coated substrate 120 in alignment with the contour 170 of defects 172 and thus in alignment with the contour line 142. Because the infrared laser beam 212 comprises a Gaussian energy distribution, interaction of the infrared laser beam 212 with the coated substrate 120 forms a thermal affected area 140 having a Gaussian shape. The thermal affected area 140 corresponds to the portions of coated substrate 120 that receive sufficient energy from the Gaussian energy distribution of infrared laser beam 212 to produce thermal stresses sufficient to induce separation of coated substrate 120 along the contour 170. That is, the thermal affected area 140 comprises a portion of the coating layer 121 and a portion of the transparent workpiece 122 into which thermal energy sufficient to induce separation of the contour 170 of defects 172 is applied. However, when the infrared laser beam 212 is directed onto the coated substrate 120 in alignment with the contour 170 of defects 172, as shown in FIG. 5A, the thermal affected area 140 is formed symmetrically in both the dummy region 126 and the primary region 124, which damages the primary region 124, for example, by causing some melt and ablation by melting or ablating the coating layer 121 on the primary region 124. Indeed, FIG. 5B shows a top view of the coated substrate 120 of FIG. 5A with a series of defects 172 separated using the laser processing technique shown in FIG. 5A. As shown in FIG. 5B, the thermal affected areas 140 extend into the primary region 124, showing that unwanted damage is generated in the primary region 124 using the technique of FIG. 5A. As noted above, the primary region 124 is the region of the coated substrate 120 that is to be used as a resultant product and thus any damage to the primary region 124 is undesired. In contrast, the dummy region 126 is a scrap region.

Figure 6:
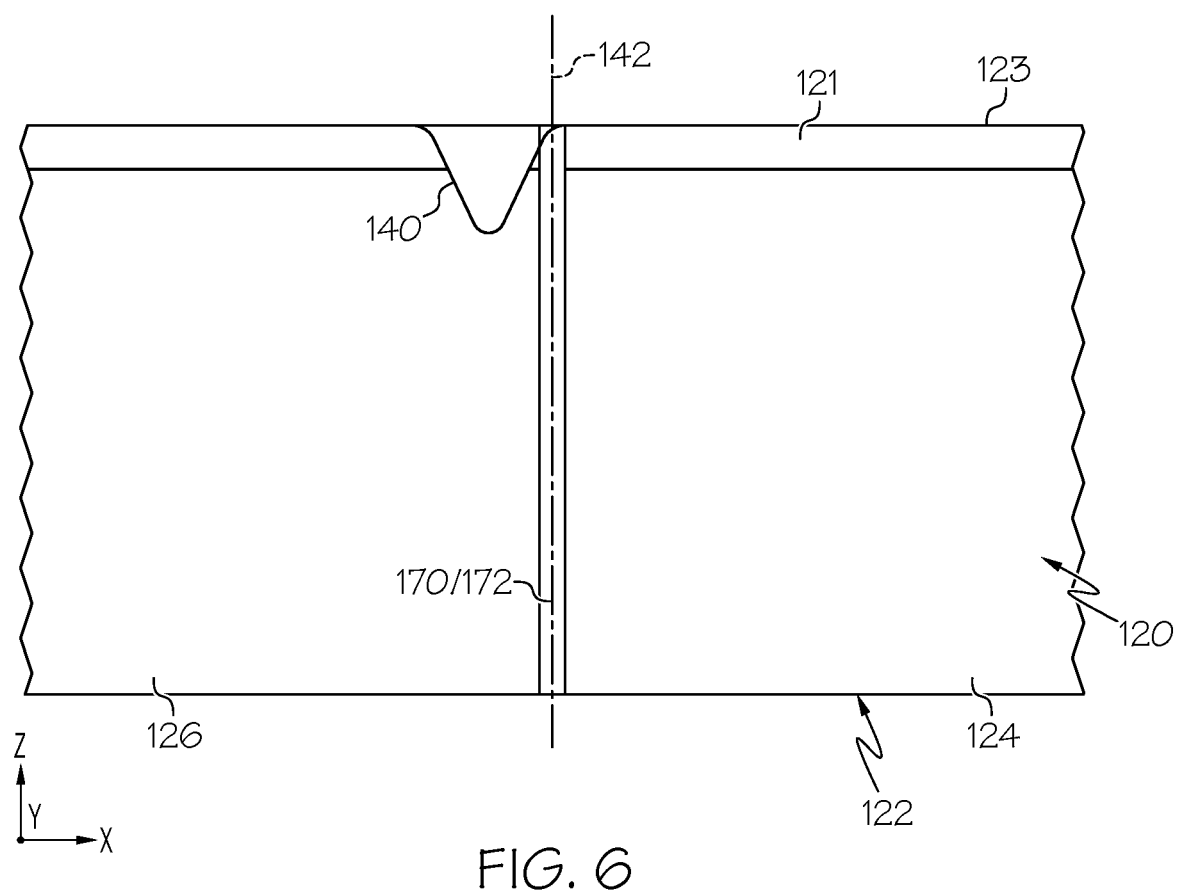
FIG. 6 schematically depicts a cross section of a coated substrate with a laser formed defect during laser processing with an infrared laser beam having a Gaussian intensity profile directed onto the coated substrate offset from the defect, according to one or more embodiments shown and described herein.

Referring now to FIG. 6, one potential solution to preventing damage to the primary region 124 is to offset the infrared laser beam 212 from the defects 172 and direct the infrared laser beam 212 predominately onto the dummy region 126 of the coated substrate 120 offset from the contour 170 of defects 172 and away from the primary region 124. In FIG. 6, the infrared laser beam 212 is directed onto the coated substrate 120 using the optical assembly 200 of FIG. 4 and comprises a Gaussian intensity profile at the coated substrate 120. Directing the infrared laser beam 212 onto the dummy region 126 away from the primary region 124 modifies the coating layer 121 on the dummy region 126 adjacent and along the contour 170 of defects 172 without ablation, melting, colorization, surface alteration and/or change in conductivity, of the coating layer 121 on the primary region 124. That is, placement of infrared laser beam 212 away from contour 170 into dummy region 126 reduces the thermal energy from the Gaussian energy distribution of infrared laser beam 212 transferred to the portion of coating layer 121 in primary region 124 to a degree sufficient to avoid damage. However, because the infrared laser beam 212 comprises a Gaussian intensity profile at the coated substrate 120, positioning the infrared laser beam 212 far enough offset from the contour 170 of defects 172 to prevent damage to the primary region 124 may fail to induce separation of the materials of the coated substrate 120 between adjacent defects 172 since it reduce the resultant temperature gradient in proximity to the defects 172. For example, positioning the infrared laser beam 212 far enough offset from the contour 170 of defects 172 to prevent damage to the primary region 124 may fail to induce tensile stress in the transparent workpiece 122 sufficient to propagate a crack along the contour 170 and through the depth of the transparent workpiece 122, since it reduces the resultant temperature gradient in proximity to the defects 172. Thus, alternative techniques for separating the coated substrate 120 (i.e., separating the primary region 124 from the dummy region 126) while minimizing or preventing damage to the primary region 124 are desired.

Referring still to FIG. 6, one technique to separate the coated substrate 120 while minimizing damage to the primary region 124 is to translate the infrared laser beam 212 offset from the contour line 142 along multiple passes, where each individual pass does not apply enough thermal energy to damage the primary region 124. While a single pass may not be sufficient to separate the contour 170 of defects 172, particularly the portions of the contour 170 of defects 172 that extend into the transparent workpiece 122, thermal energy accumulates in the transparent workpiece 122 upon multiple passes, inducing separation the coated substrate 120 along contour 170 of defects 172 without damaging primary region 124. Further, each pass may follow the same path or offset paths, each located along the dummy region 126.

Figure 7A:
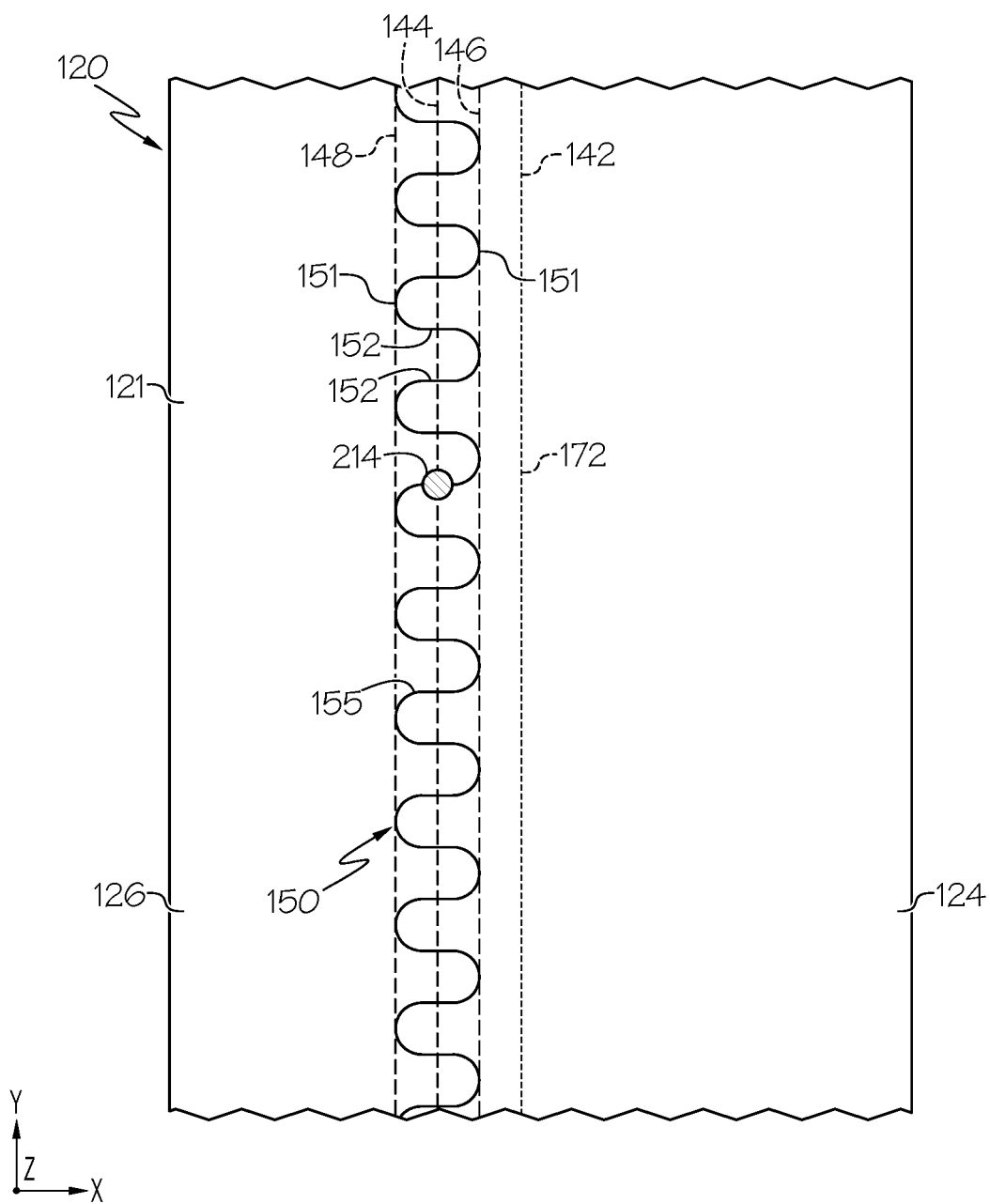
FIG. 7A schematically depicts laser processing a coated substrate along an oscillating pathway having a linear oscillation using an infrared laser beam having a Gaussian intensity profile, according to one or more embodiments shown and described herein.
Figure 7B:
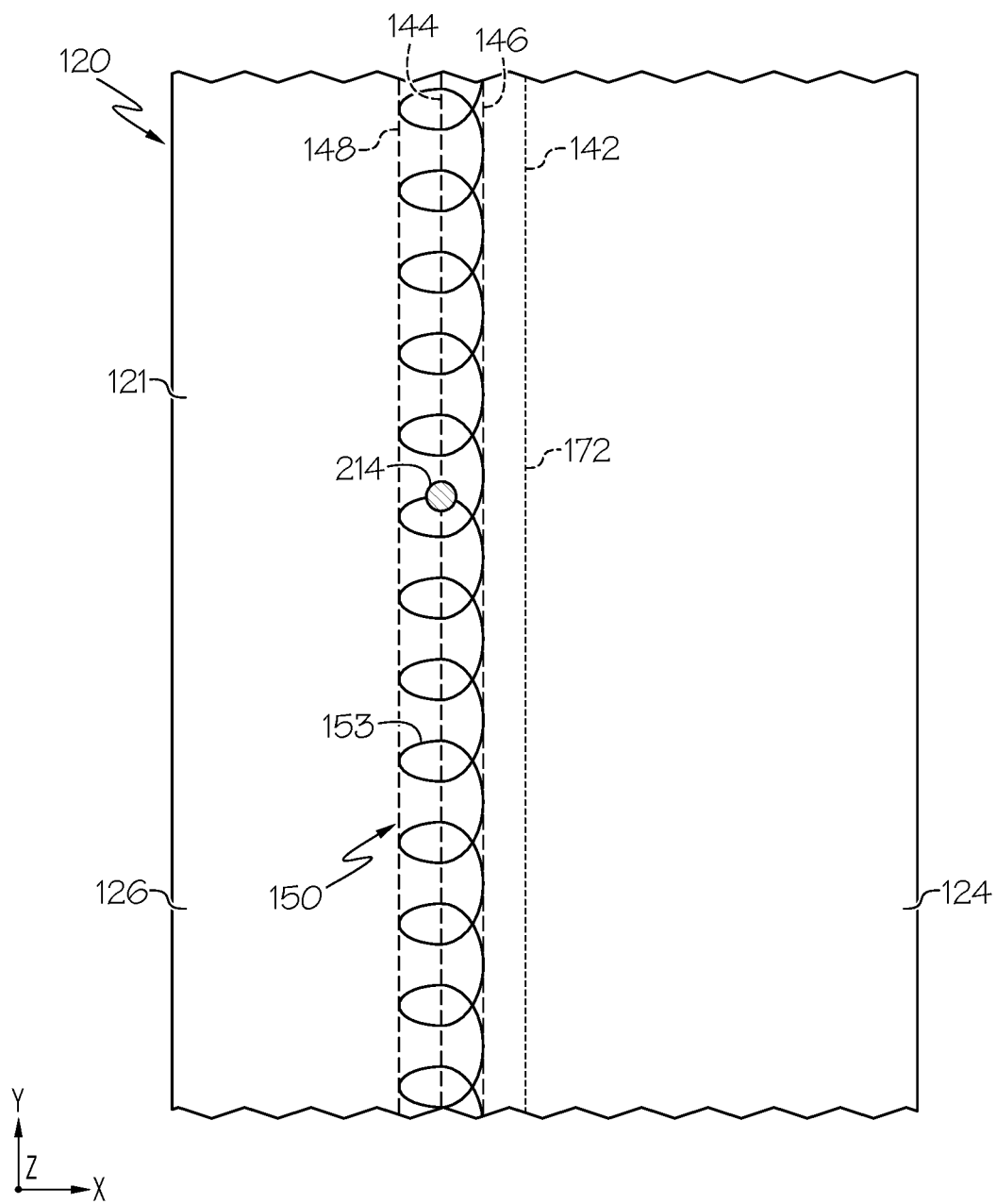
FIG. 7B schematically depicts laser processing a coated substrate along an oscillating pathway having a wobbled oscillation using an infrared laser beam having a Gaussian intensity profile, according to one or more embodiments shown and described herein.
Figure 7C:
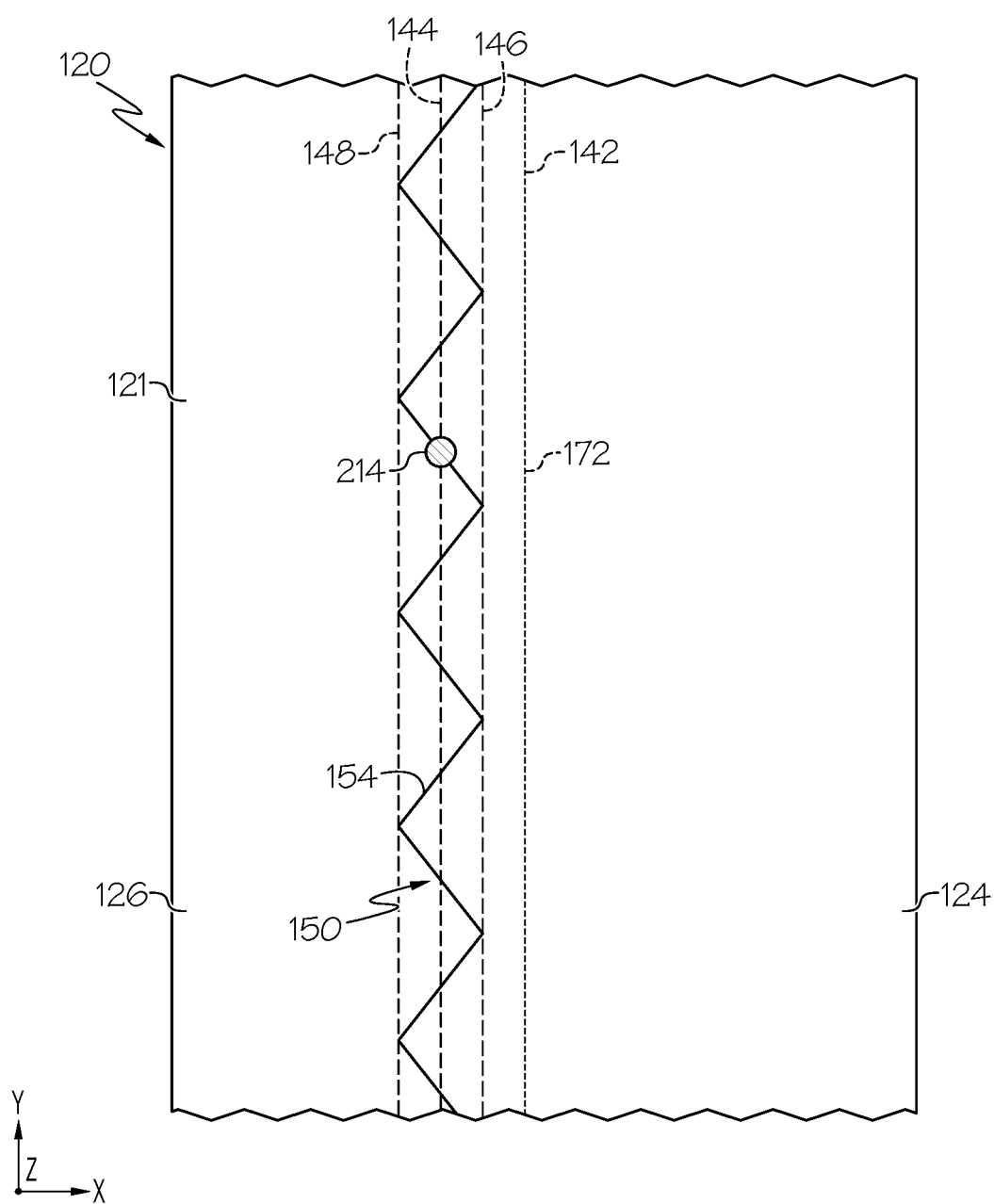
FIG. 7C schematically depicts laser processing a coated substrate along an oscillating pathway having a sawtooth oscillation using an infrared laser beam having a Gaussian intensity profile, according to one or more embodiments shown and described herein.
Figure 7D:
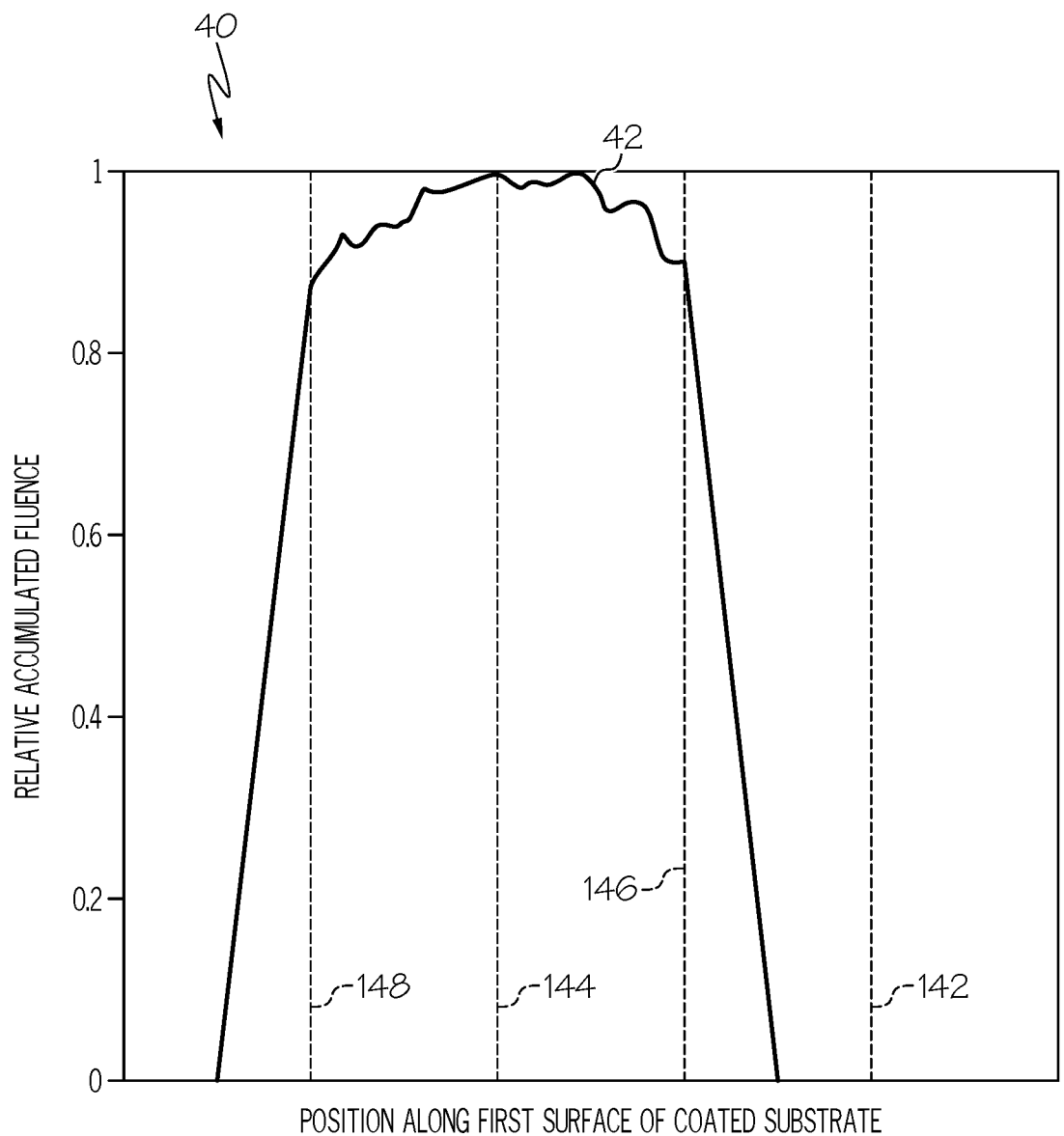
FIG. 7D graphically depicts the relative accumulated fluence applied by an laser infrared laser beam having a Gaussian intensity profile following an oscillating pathway at positions along a first surface of a coated substrate, accordingly to one or more embodiments shown and described herein.
Figure 8A:
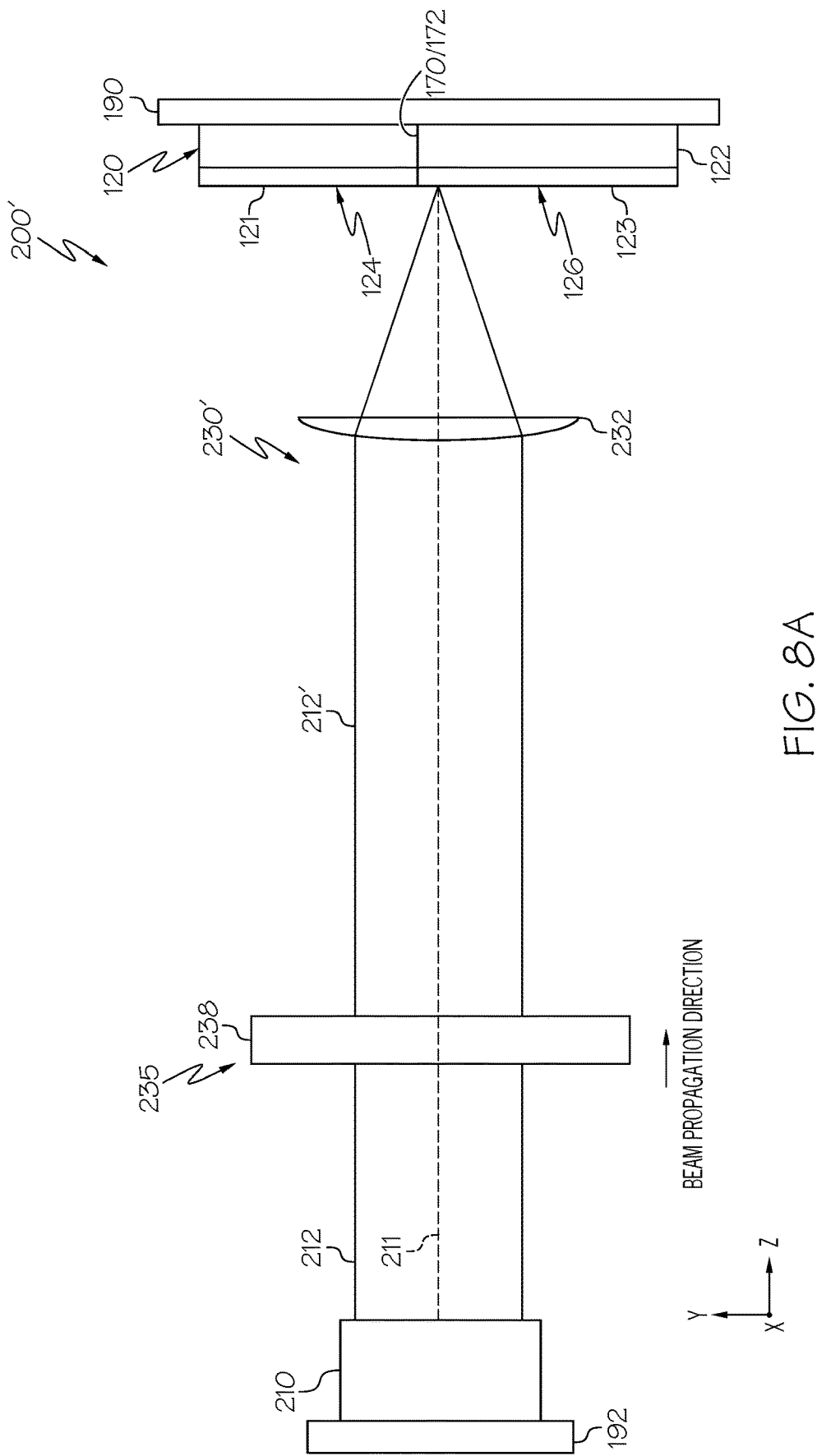
FIG. 8A schematically depicts the optical assembly of FIG. 4 with the addition of an diffractive optical element for modifying the intensity profile of the infrared laser beam, according to one or more embodiments shown and described herein.
Figure 8B:
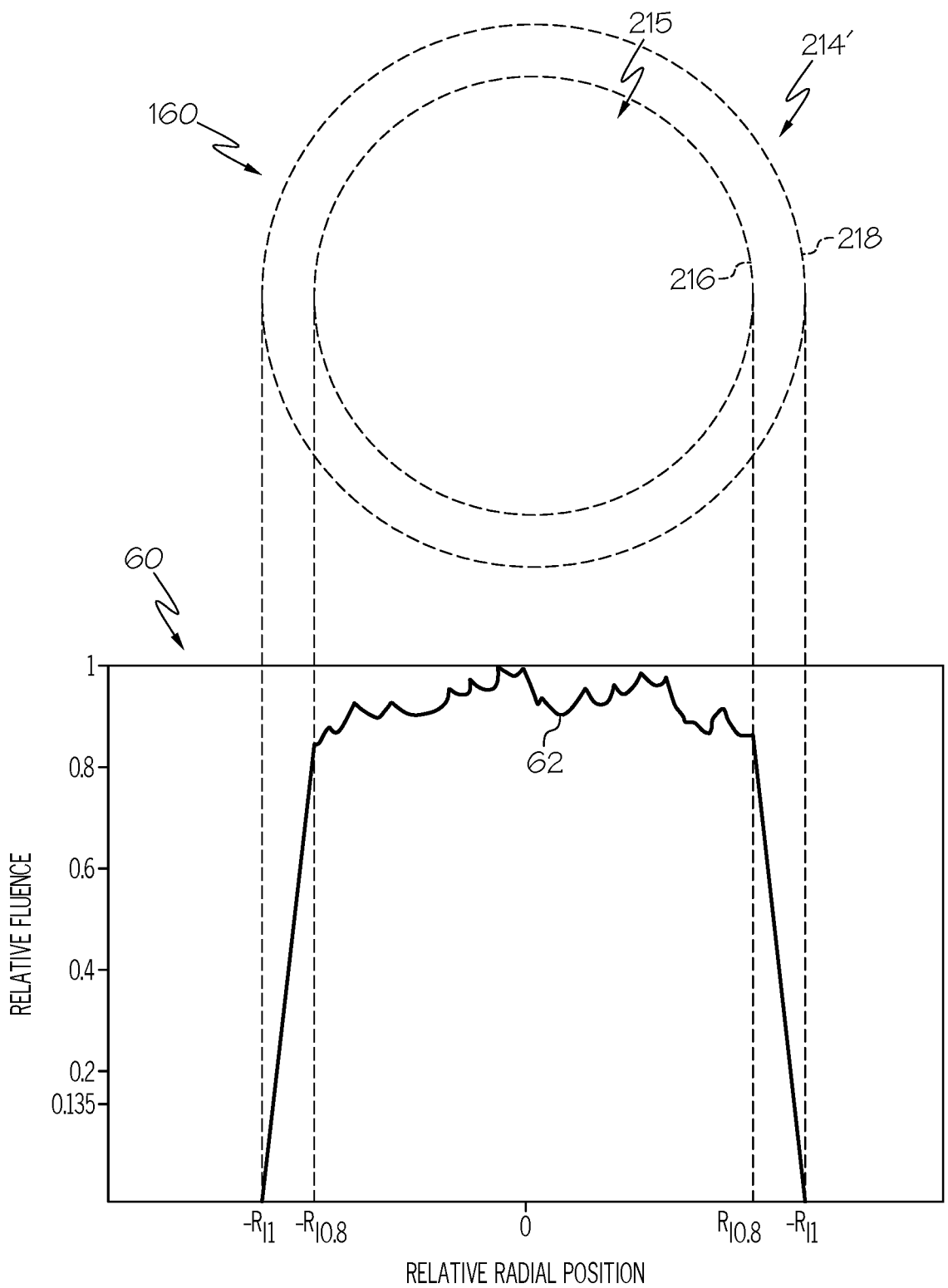
FIG. 8B graphically depicts the relative fluence vs. radial position of an infrared beam spot having a modified intensity profile projected onto the coated substrate, according to one or more embodiments shown and described herein.
Figure 8C:
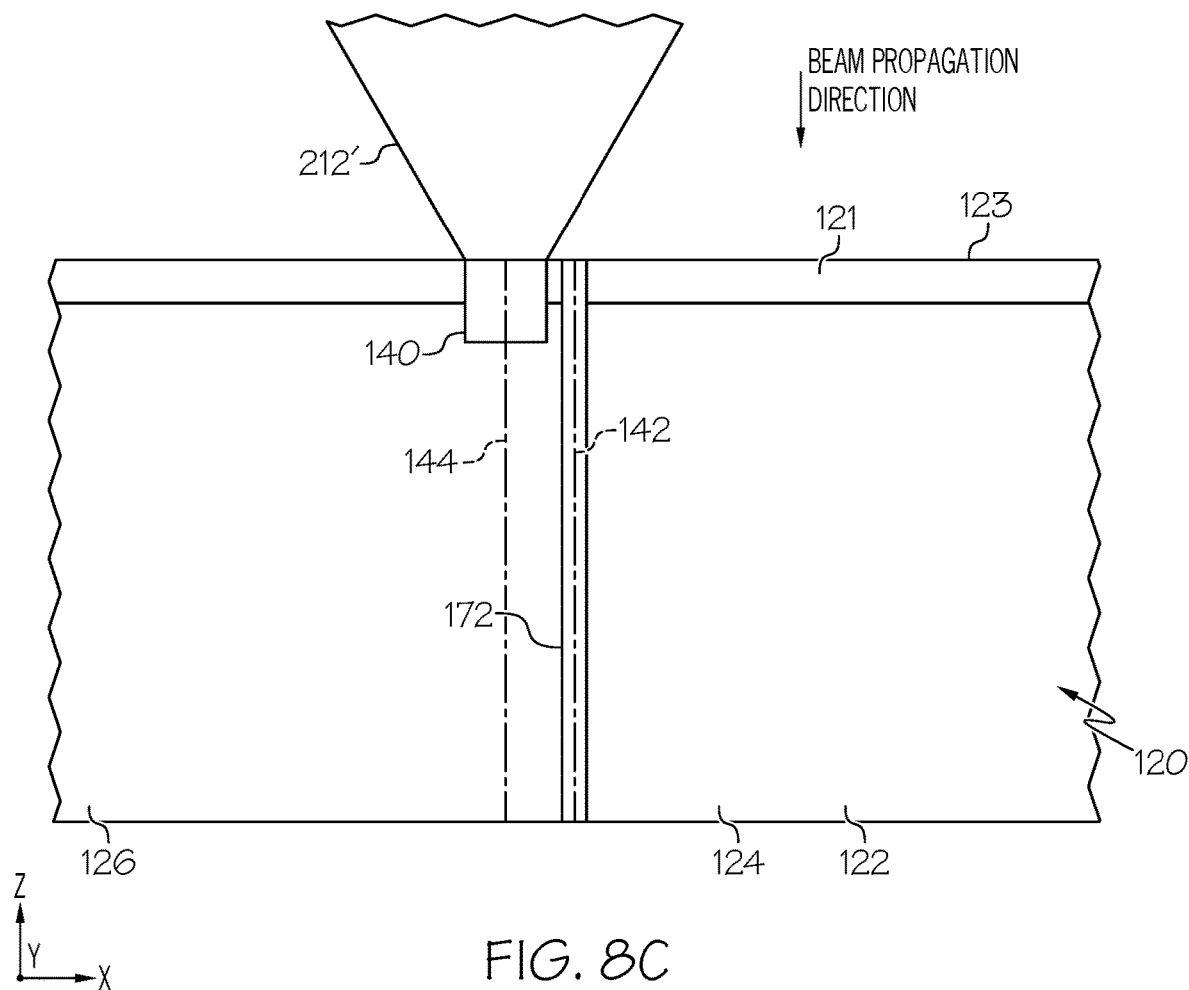
FIG. 8C schematically depicts a cross section of a coated substrate during laser processing using the infrared laser beam of FIG. 8A having a modified intensity profile, according to one or more embodiments shown and described herein.
Figure 9A:
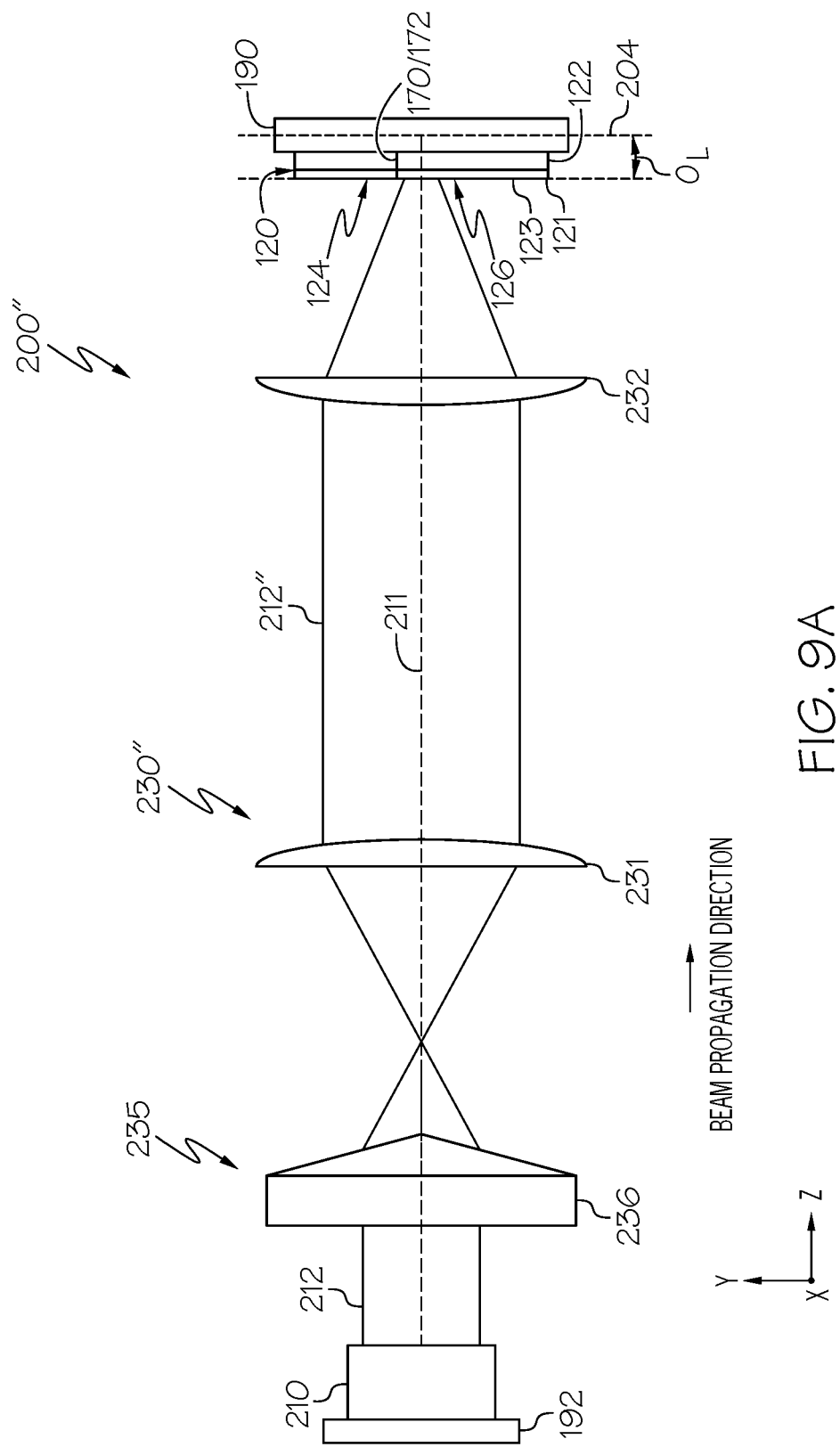
FIG. 9A schematically depicts an optical assembly for laser processing with an infrared laser beam that includes an aspheric optical element, according to one or more embodiments shown and described herein.
Figure 9B:
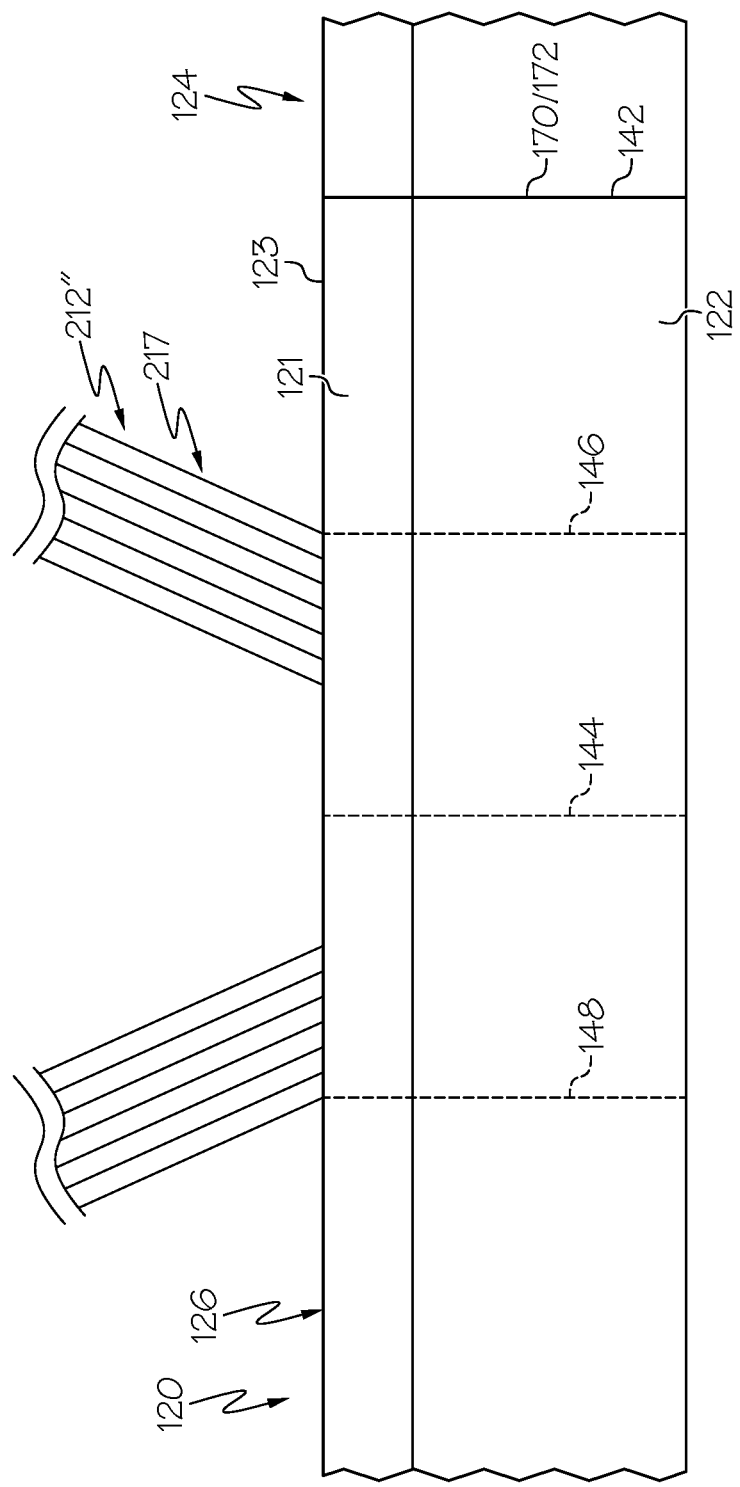
FIG. 9B schematically depicts a caustic of the infrared laser beam of FIG. 9A impinging a coated substrate, according to one or more embodiments shown and described herein.

Referring now to FIGS. 7A-9B, additional techniques to generate sufficient thermal stress to induce separation of the series of defects 172 of the coated substrate 120 along the contour line 142 while limiting or preventing damage to the primary region 124 of the coated substrate 120 will now be described. In particular, FIGS. 7A-7D depict a method of laser processing the coated substrate 120 along an oscillating pathway 150 using the infrared laser beam 212 of FIG. 4 having a Gaussian intensity profile, FIGS. 8A-8C depict methods of laser processing the coated substrate 120 using an infrared laser beam 212' having a modified energy distribution, and FIGS. 9A and 9B depict a method of laser processing the coated substrate 120 using an infrared laser beam 212" formed into an annulus and directed onto the first surface 123 of the coated substrate 120 offset from a focal plane 204 of a final focusing element. Each of these techniques induce separation of the contour 170 of defects 172 in the coated substrate 120 in a single pass while limiting or preventing damage to the primary region 124 of the coated substrate 120. Indeed, the techniques described herein reduce tact time, reduce debris generated during the process, and reduce the complexity of the optical system. Furthermore, while these techniques are primarily described herein with respect to the coated substrate 120 comprising the transparent workpiece 122 and the coating layer 121, it should be understood that these techniques are also applicable to the separation of single substrates, such as uncoated transparent workpieces, which may benefit from the decrease in chipping and heat cracks and thus a higher release speed.

Referring now to FIGS. 7A-7C, a schematic top view of the coated substrate 120 comprising a plurality of defects 172 positioned along the contour line 142 undergoing a separating step using the infrared laser beam 212 is depicted. In the method depicted in FIGS. 7A-7C, the infrared laser beam 212 follows the oscillating pathway 150. In particular, at least one of the coated substrate 120 and the infrared laser beam 212 are translated relative to each other such that an infrared beam spot 214 traces the oscillating pathway 150. The infrared beam spot 214 is projected by the infrared laser beam 212 on the first surface 123 of the coated substrate 120. The oscillating pathway 150 is disposed on the dummy region 126 such that infrared laser beam 212 generates minimal to no damage on the primary region 124. Similar to the embodiment of FIG. 6, above, the infrared laser beam 212 comprises a Gaussian energy distribution; however, the oscillating pathway 150 facilitates the application of enough thermal energy to the dummy region 126 of the coated substrate 120 to induce separation of the coated substrate 120 along the contour line 142 while avoiding damage to primary region 124. Traversal of infrared laser beam 212 along the oscillating pathway 150 provides a mechanism to control the amount of thermal energy transferred to primary region 124. As infrared laser beam 212 moves closer to contour line 142, more thermal energy is transferred to the vicinity of defects 172 and thermal energy sufficient to induce separation of transparent workpiece 122 is available. To prevent damage to the coating layer 121 in primary region 124, the motion of infrared laser beam 212 is reversed and moved away from contour line 142 to prevent excess transfer of thermal energy to primary region 124. By controlling the power of infrared laser beam 212, the speed of traversal of infrared laser beam 212 along oscillating pathway 150 and the proximity of closest approach of infrared laser beam 212 to contour line 142, as well as the number of times the infrared laser beam 212 reaches the distance of closest approach to the contour line 142, transfer of thermal energy is controlled and separation of primary region 124 from dummy region 126 without damage to the coating layer 121 in primary region 124 is achievable.

As depicted in FIG. 7A-7C, the oscillating pathway 150 follows an offset line 144 in a translation direction while oscillating between an inner track line 146 and an outer track line 148. In the embodiments depicted in FIGS. 7A-7C, each oscillation extends from one of the inner track line 146 or the outer track line 148 to the other. However, it should be understood that, in some embodiments, the oscillating pathway 150 may oscillate between the inner track line 146 and the outer track line 148 without reaching the inner track line 146, the outer track line 148, or both, during some or all of the oscillations. Each of the offset line 144, the inner track line 146, and the outer track line 148 are disposed on the dummy region 126 of the coated substrate 120. In particular, each of the offset line 144, the inner track line 146 and the outer track line 148 are parallel pathways on the dummy region 126 of the coated substrate 120 and are each parallel to the contour line 142. For example, in the embodiment depicted in FIG. 7A, the contour line 142 is linear along the Y axis and the transverse axis is the X axis. However, it should be understood that the contour line 142 and the offset line 144 may be curved or otherwise non-linear and thus the transverse axis may change at points along the offset line 144 to retain orthogonality with the offset line 144.

The offset line 144 may be spaced a distance of 0.2 mm to 3 mm from the contour line 142, such as from 0.5 mm to 2 mm from the contour line 142, for example, the offset line 144 may be spaced from the contour line 142 by a distance of 0.2 mm, 0.3 mm, 0.4 mm, 0.5 mm, 0.6 mm, 0.7 mm, 0.8 mm, 0.9 mm 1 mm, 1.1 mm, 1.2 mm, 1.3 mm, 1.4 mm, 1.5 mm, 1.6 mm, 1.7 mm, 1.8 mm, 1.9 mm, 2 mm, 2.25 mm, 2.5 mm, 2.75 mm, 3 mm, or any range having any two of these values as endpoints. The inner track line 146 may be spaced a distance of 0.25 mm to 2 mm from the contour line 142, such as a distance of from 0.5 mm to 1.5 mm from the contour line 142, for example, the inner track line 146 may be spaced from the contour line 142 by a distance of 0.25 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.75 mm, 2 mm, or any range having any two of these values as endpoints. The outer track line 148 may be spaced a distance of 0.75 mm to 4 mm from the contour line 142, such as a distance of from 1.5 mm to 2.5 mm from the contour line 142, for example, the outer track line 148 may be spaced from the contour line 142 by a distance of 0.75 mm, 1 mm, 1.25 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.75 mm, 3 mm, 3.25 mm, 3.5 mm, 3.75 mm, 4 mm, or any range having any two of these values as endpoints. Furthermore, the offset line 144 may be equally spaced from both the inner track line 146 and the outer track line 148. In addition, the spacing distance between the offset line 144 and each of the inner track line 146 and the outer track line 148 may be the same as the distance between the inner track line 146 and the contour line 142.

Furthermore, the spacing distances between the contour line 142, the offset line 144, the inner track line 146, and the outer track line 148 may be a function of the $1/e^2$ beam diameter of the infrared beam spot 214. For example, the spacing distances between the contour line 142, the offset line 144, the inner track line 146, and the outer track line 148 may be at least half the $1/e^2$ beam diameter of the infrared beam spot 214. The $1/e^2$ beam diameter of the infrared beam spot 214 is in a range of from 350 µm to 2 mm, such as from 500 µm to 1 mm, or from 600 µm to 900 µm, for example, 500 µm, 550 µm, 600 µm, 650 µm, 700 µm, 750 µm, 800 µm, 850 µm, 900 µm, 950 µm, 1 mm, 1.5 mm, 2 mm, or any range having any two of these values as endpoints. In operation, a $1/e^2$ beam diameter of the infrared beam spot 214 in the above ranges may facilitate high precision application of thermal energy to the coated substrate 120 and allows the infrared beam spot 214 to oscillate along the oscillating pathway 150 without impinging the primary region 124.

In operation, as the infrared laser beam 212 is translated such that the infrared beam spot 214 traces the oscillating pathway 150, the infrared laser beam 212 applies thermal energy to the coated substrate 120 to induce separation of the series of defects 172 of the coated substrate 120 along the contour line 142 while limiting or preventing damage to the primary region 124 of the coated substrate 120. For example, as depicted in FIG. 4, a scanner 192 is coupled to the infrared beam source 210 and is configured to translate the infrared beam source 210 and infrared laser beam 212 such that the infrared beam spot 214 traces the oscillating pathway 150. In particular, the scanner 192 may both oscillate the infrared laser beam 212 while linearly translating the infrared laser beam 212. The speed of motion of infrared laser beam 212 is preferably greater than or equal to 10 mm/s, such as between 10 mm/s and 2000 mm/s, or between 20 mm/s and 1500 mm/s, or between 30 mm/s and 1200 mm/s, or between 40 mm/s and 1000 mm/s, or between 50 mm/s and 800 mm/s, or between 60 mm/s and 500 mm/s.

Furthermore, each of FIGS. 7A-7C depict different embodiments of the oscillating pathway 150. For example, FIG. 7A depicts an embodiment of the oscillating pathway 150 that is a pendulum pathway 155, FIG. 7B depicts an embodiment of the oscillating pathway 150 that is a wobbling pathway 153, and FIG. 7C depicts an embodiment of the oscillating pathway 150 that is a sawtooth pathway 154.

Referring now to FIG. 7A, in some embodiments the oscillating pathway 150 is a pendulum pathway 155 that follows the offset line 144 in a translation direction while oscillating along a transverse axis between an inner track line 146 and an outer track line 148, where the transverse axis is orthogonal the offset line 144. For example, the pendulum pathway 155 has a plurality of rounded portions 151 and a plurality of straight portions 152. The plurality of rounded portions 151 each reach either the inner track line 146 or the outer track line 148. Further, the straight portions 152 each extend between two rounded portions 151 and traverse the offset line 144. Indeed, as depicted in FIG. 7A, the straight portions 152 extend along the transverse axis, which is orthogonal to the offset line 144. In some embodiments, the plurality of straight portions 152 each comprise a length of from 0.25 mm to 2 mm, such as from 0.5 mm to 1.5 mm, for example, 0.25 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.75 mm, 2 mm, or any range having any two of these values as endpoints. In some embodiments, the plurality of rounded portions 151 each comprise a radius of curvature of from 0.25 mm to 2 mm, such as from 0.5 mm to 1.5 mm, for example, 0.25 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.75 mm, 2 mm, or any range having any two of these values as endpoints.

Referring now to FIG. 7B, in some embodiments the oscillating pathway 150 is a wobbling pathway 153 that rotationally oscillates between the inner track line 146 and the outer track line 148 while following the offset line 144 in the translation direction. In operation, the wobbling pathway 153 may be achieved using the scanner 192. In particular, the scanner 192 may rotate the infrared laser beam 212 (e.g., rotate the infrared beam source 210) in a rounded pattern around a central axis of the scanner 192 while linearly translating the infrared laser beam 212 along the translation direction to follow the offset line 144. In some embodiments, the rounded pattern is a circle or ellipse and in some embodiments, the rounded pattern may be a Lissajou pattern. Referring now to FIG. 7C, in some embodiments, the oscillating pathway 150 is a sawtooth pathway 154 having a plurality of straight portions connected angular turns at or between the inner track line 146 and the outer track line 148 while following the offset line 144 in the translation direction.

Referring now to FIGS. 7A-7D, by irradiating the dummy region 126 of the coated substrate 120 with the infrared laser beam 212 along the oscillating pathway 150 of FIGS. 7A-7C, the accumulated fluence applied by the infrared laser beam 212 onto the dummy region 126 of the coated substrate 120 follows a top hat accumulated fluence distribution in which 20% or less of the total energy applied to the dummy region 126 is applied to portions of the dummy region 126 not located between the inner track line 146 and the outer track line 148 and that portions of the dummy region 126 between the inner track line 146 and the outer track line 148 are impinged by an accumulated fluence of greater than 80% of the maximum accumulated fluence applied any portion of the dummy region 126. This top hat accumulated fluence distribution is graphically depicted in FIG. 7D, in which line 42 of graph 40 depicts the relative accumulated fluence as a function of position along a portion of the dummy region 126. The relative accumulated fluence at the peak of the accumulated fluence distribution is normalized to 1 and the balance of the accumulated fluence distribution is scaled proportionally.

Referring now to FIGS. 8A-8C, another method of laser processing the coated substrate 120 using an infrared laser beam 212' having a modified energy distribution is schematically depicted. FIG. 8 schematically depicts an optical assembly 200' and lens assembly 230', which includes the optical assembly 200 of FIG. 4 with the addition of a diffractive optical element 238 for modifying the intensity profile of the infrared laser beam 212. In particular, the infrared laser beam 212 output by the infrared beam source 210 comprises a Gaussian energy distribution and after traversing the diffractive optical element 238 and reaching the coated substrate 120, the infrared laser beam 212 (now infrared laser beam 212') comprises a modified, top hat energy distribution. Thus, an infrared beam spot 214' (FIG. 8B) projected by the infrared laser beam 212' onto the first surface 123 of the coated substrate 120 comprises a top hat energy distribution. As used herein, a "top hat energy distribution" refers to an energy distribution in which 20% of the total energy of infrared beam spot (e.g., infrared beam spot 214' of FIG. 8B) has a fluence less than 80% of the maximum fluence. In the illustrative example of FIG. 8B, 80% or more of the total energy of the infrared beam spot 214' is within an inner region (e.g., inner region 215) bounded at 80% of a maximum fluence of the infrared beam spot 214'.

Referring now to FIG. 8B, the infrared beam spot 214' formed using the optical assembly 200' of FIG. 8A is schematically depicted in association with a graph 60, which includes line 62 showing the relative fluence as a function of the relative radial position within the infrared beam spot 214'. The relative fluence at the peak of the fluence distribution is normalized to 1 and the balance of the fluence distribution is scaled proportionally. As shown in FIG. 8B, the infrared beam spot 214' includes an outer perimeter 218, an inner perimeter 216, and an inner region 215 bounded by the inner perimeter 216, which is defined by a particular relative fluence, such as 80% of the maximum fluence of the infrared beam spot 214'. In some embodiments, the infrared beam spot 214' comprises an energy distribution in which 10% or less of the total energy of the infrared beam spot 214' has less than 80% of the maximum fluence. In some embodiments, the infrared beam spot 214' comprises an energy distribution in which less than 5% of the total energy of the infrared beam spot 214' has a fluence less than 80% of the maximum fluence. In some embodiments, the infrared beam spot 214' comprises an energy distribution in which less than 5% of the total energy of the infrared beam spot 214' has a fluence less than 90% of the maximum fluence.

Referring now to FIG. 8C, a cross section of the coated substrate 120 during laser processing with the infrared laser beam 212' of FIG. 8A is schematically depicted. Because the infrared beam spot 214' comprises a top hat energy distribution, the resultant thermal affected area 140 formed in the coated substrate 120 comprises a substantially rectilinear shape. The substantially rectilinear shape means that the decrease in fluence from a relative fluence of 80% of the maximum fluence to 10%, 5%, or even 1% of the maximum fluence is steep so that, relative to a Gaussian distribution centered at the same position, a significantly reduced overlap of the wings of the distribution with the primary region 124 occurs. As a result, the region of high fluence of the top hat energy distribution can be placed closer to defects 172 to promote thermal separation without inducing damage to the coating layer 121 in primary region 124. In operation, the infrared laser beam 212' projects the infrared beam spot 214' onto the first surface 123 of the coated substrate 120 in the dummy region 126 of the coated substrate 120. In particular, the infrared beam spot 214' is projected onto the offset line 144 such that the infrared beam spot 214' is offset from the contour line 142. For example, the infrared beam spot 214' may be centered onto the offset line 144 such that the offset line 144 bisects the infrared beam spot 214'. In some embodiments, the inner perimeter 216 of the infrared beam spot 214' may be disposed at the inner track line 146 and the outer track line 148 or between the inner track line 146 and the outer track line 148.

Forming the thermal affected area 140 using the infrared laser beam 212' of FIG. 8A-8C further comprises translating at least one of the coated substrate 120 and the infrared laser beam 212' relative to each other such that the infrared beam spot 214' follows the offset line 144. Without intending to be limited by theory, the infrared laser beam 212' applies thermal energy to the coated substrate 120 to induce separation of the series of defects 172 of the coated substrate 120 along the contour line 142 while limiting or preventing damage to the primary region 124 of the coated substrate 120. Indeed, because the infrared beam spot 214' comprises a modified energy distribution that sharply drops at a particular radial location (e.g., a top hat energy distribution), the infrared laser beam 212' applies thermal energy sufficient to damage the coated substrate 120 to the dummy region 126 and not to the primary region 124. Furthermore, it should be understood that in some embodiments, the infrared beam spot 214' of FIGS. 8A-8C having a top hat energy distribution may be traversed along the oscillating pathway 150 of FIGS. 7A-7C.

Referring now to FIG. 9A, an optical assembly 200" for laser processing with an infrared laser beam 212" formed into an annulus using an aspheric optical element 235 (such as an axicon 236) is schematically depicted. The aspheric optical element 235 may comprise any of the embodiments of the aspheric optical element 135 described above with respect to FIGS. 1-3. Indeed, the aspheric optical element 235 may modify the infrared laser beam 212 output by the infrared beam source 210 into a phase modified infrared laser beam 212" having an annular shape. Without intending to be limited by theory, the infrared laser beam 212" comprises the phase characteristics that form the pulsed laser beam 112 of FIGS. 1-3 into a quasi-non-diffracting beam. However, in the embodiment depicted in FIG. 9A, the infrared laser beam 212" impinges the coated substrate 120 while having an annular shape (e.g., upstream a focal plane of a final focusing element).

Further, as shown in FIG. 9A, the optical assembly 200" comprises a lens assembly 230", which may further comprise one or more lenses 231, 232, which may comprise the same lenses as lenses 131, 132 of the lens assembly 130 of FIG. 2. Further, in the embodiment of the optical assembly 200" depicted in FIG. 9A, the lens 232 operates as the final focusing element, that is, the final focusing element the infrared laser beam 212" traverses before impinging the coated substrate 120. While lens 232 is depicted as the final focusing element, it should be understood that the aspheric optical element 235 may alternatively be positioned as the final focusing element. The final focusing element comprises a focal length that extends from the final focusing element to a focal plane 204. As shown in FIG. 9A, the final focusing element (i.e., the second lens 232) and the first surface 123 of the coated substrate are positioned relative to one another such that the focal plane 204 is offset from the first surface 123 of the coated substrate 120 may an offset length $O_L$.

Referring now to FIG. 9B, a caustic 217 of the infrared laser beam 212" downstream the final focusing element (i.e., the second lens 232). As used herein, a "caustic" refers to an envelope of light of a laser beam refracted by an optical component and thereafter directed onto and/or a substrate. For example, the caustic may comprise the envelope of light of a laser beam extending from the most downstream optical component of an optical system onto and/or into a substrate. As shown by its caustic 217, the annular shaped infrared laser beam 212" impinged the coated substrate 120 at locations at or between the inner track line 146 and the outer track line 148. Indeed, in some embodiments, the offset line 144 bisects the caustic 217 of the infrared laser beam 212". Furthermore, it should be understood that in some embodiments, the infrared laser beam of FIGS. 9A and 9B having a annular shape may be traversed along the oscillating pathway 150 of FIGS. 7A-7C.

Figure 9C:
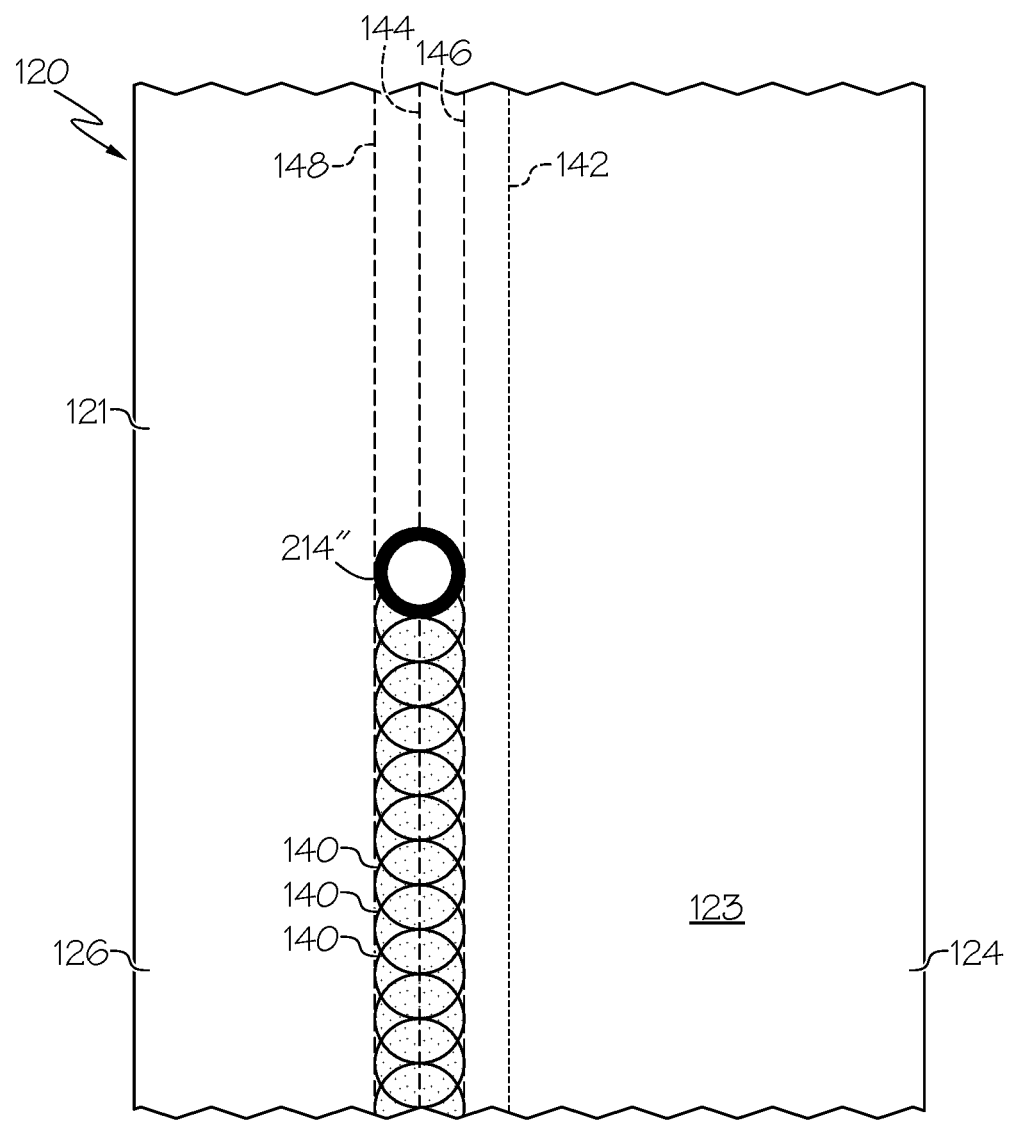
FIG. 9C schematically depicts a top view of the coated substrate of FIG. 9A during laser processing using the infrared laser beam of FIG. 9A, according to one or more embodiments shown and described herein.
Figure 9D:
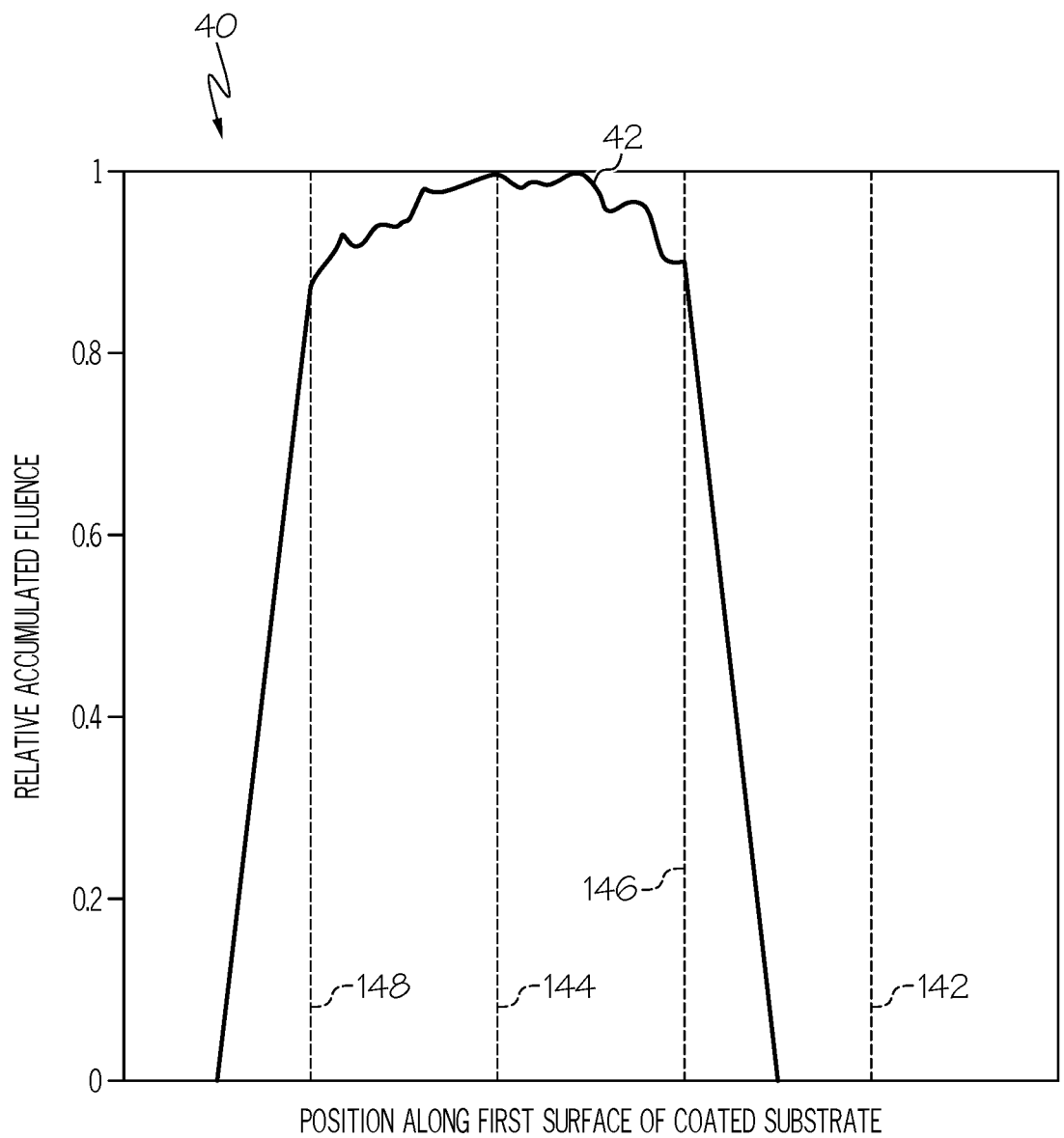
FIG. 9D graphically depicts the relative accumulated fluence applied by the laser infrared laser beam of FIGS. 9A-9C to locations of the coated substrate, accordingly to one or more embodiments shown and described herein.

Referring now to FIG. 9C, because the infrared laser beam 212" impinges the first surface 123 offset from the focal plane 204, the infrared laser beam 212" projects an infrared beam spot 214" onto the first surface of the coated substrate that comprises an annular shape. FIG. 9C schematically depicts a top view of the coated substrate 120 of FIG. 9A during laser processing using the infrared laser beam 212" of FIG. 9A. In operation, laser processing the coated substrate 120 using the infrared laser beam 212" comprises translating at least one of the coated substrate 120 and the infrared laser beam 212" relative to each other such that the infrared beam spot 214" follows the offset line 144. For example, the offset line 144 may bisect the infrared beam spot 214". Further, the infrared beam spot 214" may projected onto the dummy region 126 without impinging the primary region 124.

Further, in some embodiments, the infrared laser beam 212" comprises a pulsed infrared laser beam (i.e., in some embodiments, the infrared beam source 210 may be a pulsed infrared beam source). In embodiments in which the infrared laser beam 212" is pulsed, when translating at least one of the coated substrate 120 and the infrared laser beam 212" relative to each other, the infrared laser beam 212" impinges the first surface of the coating substrate at locations (i.e., impingement locations 141) along the offset line spaced apart from one another by a distance of from ¼ a diameter of the infrared beam spot 214" to ½ the diameter of the infrared beam spot 214", for example, ⅓ the diameter of the infrared beam spot 214". This spacing distance between impingement locations 141 may be altered by altering the pulse rate of the infrared laser beam 212", the translation rate of the infrared laser beam 212" and the coated substrate 120 relative to one another, or both. Without intending to be limited by theory, a ¼ to ½ overlap between adjacent impingement locations 141 causes more continuous damage along the offset line 144 than fully spacing the impingement locations 141 apart. Similar to the embodiments, of 7A-7D and the embodiments of 8A-8C, the infrared laser beam 212" applies thermal energy to the coated substrate 120 thereby inducing crack propagation within the coated substrate 120 along the plurality of defects 172, thereby separating the coated substrate 120 along the contour line 142.

Indeed, by irradiating the dummy region 126 of the coated substrate 120 with the annulus of the infrared laser beam 212" along the offset line 144, as depicted in FIGS. 9A-9C, the accumulated fluence applied by the infrared laser beam 212" onto the dummy region 126 of the coated substrate 120 follows a top hat accumulated fluence distribution in which 20% or less of the total energy applied to the dummy region 126 is applied to portions of the dummy region 126 not located between the inner track line 146 and the outer track line 148 and that portions of the dummy region 126 between the inner track line 146 and the outer track line 148 are impinged by an accumulated fluence of greater than 80% of the maximum accumulated fluence applied any portion of the dummy region 126. This top hat accumulated fluence distribution is graphically depicted in FIG. 9D, in which line 82 of graph 80 depicts the relative accumulated fluence as a function of position along a portion of the dummy region 126. The relative accumulated fluence at the peak of the accumulated fluence distribution is normalized to 1 and the balance of the accumulated fluence distribution is scaled proportionally.

In view of the foregoing description, it should be understood that a coated substrate comprising a transparent workpiece and a coating layer may be laser separated while limiting or preventing damage to a primary region of the coated substrate. The methods described herein include using a pulsed laser beam to form a series of defects in the transparent workpiece and an infrared laser beam to separate the transparent workpiece and the coating layer along the series of defects, which are formed along a boundary between the primary region and a dummy region. Methods described herein include translating an infrared laser beam along an oscillating pathway on the dummy region to separate the coated substrate, modifying the energy distribution of an infrared laser beam into a top hat energy distribution and directing this modified laser beam onto the dummy region to separate the coated substrate, and forming the infrared laser beam into an annular shape and directing this annular infrared laser beam onto the dummy region to separate the coated substrate. As described herein, these methods direct thermal energy onto the dummy region of the coated substrate using techniques sufficient to both induce crack propagation of the defects disposed in the coated substrate along the boundary between the primary region and the dummy region in a single process step.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of separating a coated substrate, the method comprising:
 directing an infrared laser beam onto a first surface of the coated substrate wherein:
  the coated substrate comprises a coating layer disposed on a transparent workpiece;
  a plurality of defects is disposed within the coated substrate, extending into both the coating layer and the transparent workpiece and disposed along a contour line that divides a primary region of the coated substrate from a dummy region of the coated substrate; and
  the infrared laser beam projects an infrared beam spot onto the first surface of the coated substrate; and
 translating at least one of the coated substrate and the infrared laser beam relative to each other such that the infrared beam spot traces an oscillating pathway, wherein:
  the oscillating pathway follows an offset line in a translation direction and oscillates between an inner track line and an outer track line, wherein each of the offset line, the inner track line, and the outer track line are disposed on the dummy region of the coated substrate such that the oscillating pathway is disposed entirely on the dummy region of the coated substrate and the offset line is parallel to and offset from the contour line; and the infrared laser beam applies thermal energy to the plurality of defects disposed in the coated substrate and induces separation of the coated substrate along the contour line.

2. The method of claim 1, wherein when tracing the oscillating pathway, the infrared beam spot applies thermal energy to the dummy region of the coated substrate without melting or ablating the coating layer of the primary region of the coated substrate.

3. The method of claim 1, wherein the oscillating pathway follows a linear oscillation in which the oscillating pathway oscillates along a transverse axis that is orthogonal to the offset line.

4. The method of claim 1, wherein the oscillating pathway follows a wobbling oscillation in which the oscillating pathway rotationally oscillates between the inner track line and the outer track line while following the offset line in the translation direction.

5. The method claim 1, wherein the oscillating pathway is a sawtooth pathway having angular turns at or between the inner track line and the outer track line while following the offset line in the translation direction.

6. The method of claim 1, wherein:
the offset line is spaced a distance of from 1 mm to 2 mm from the contour line;
the inner track line is spaced a distance of from 0.5 mm to 1.5 mm from the contour line; and
the outer track line is spaced a distance of from 1.5 mm to 2.5 mm from the contour line.

7. The method of claim 1, wherein:
the infrared laser beam is generated by an infrared beam source; and
the infrared beam source is coupled to a scanner configured to translate the infrared laser beam such that the infrared beam spot traces the oscillating pathway.

8. The method of claim 1, wherein the coating layer comprises a polymer or a metal oxide.

9. The method of claim 1, further comprising:
forming the plurality of defects in the coated substrate prior to directing the infrared laser beam onto the first surface the coated substrate by directing a pulsed laser beam into the coated substrate, wherein:
the pulsed laser beam forms a pulsed laser beam focal line extending into the coating layer and the transparent workpiece, the pulsed laser beam focal line inducing absorption in the coating layer and the transparent workpiece, the induced absorption producing an individual defect in the coated substrate; and
the pulsed laser beam focal line comprises:
a wavelength $\lambda$;
a spot size $w_o$; and
a Rayleigh range $Z_R$ that is greater than $$F_D \frac{\pi w_o^2}{\lambda},$$

where $F_D$ is a dimensionless divergence factor comprising a value of 10 or greater; and
translating at least one of the coated substrate and the pulsed laser beam relative to each other along the contour line to form the plurality of defects in the coated substrate.

10. A method of separating a coated substrate, the method comprising:
directing an infrared laser beam onto a first surface of the coated substrate, wherein:
the coated substrate comprises a coating layer disposed on a transparent workpiece;
a plurality of defects is disposed within the coated substrate, extending into both the coating layer and the transparent workpiece and disposed along a contour line that divides a primary region of the coated substrate from a dummy region of the coated substrate;
the infrared laser beam projects an infrared beam spot onto the first surface of the coated substrate; and
the infrared beam spot comprises an energy distribution in which 20% or less of a total energy of the infrared beam spot has a fluence less than 80% of a maximum fluence of the infrared beam spot; and
translating at least one of the coated substrate and the infrared laser beam relative to each other such that the infrared beam spot follows an offset line, wherein:
the offset line is disposed on the dummy region of the coated substrate and is offset from the contour line such that the inner region of the infrared beam spot is projected entirely onto the dummy region and not on the primary region; and
the infrared laser beam applies thermal energy to the plurality of defects disposed in the coated substrate and induces separation of the coated substrate along the contour line.

11. The method of claim 10, wherein when following the offset line, the infrared beam spot applies thermal energy to the dummy region of the coated substrate without melting or ablating the coating layer of the primary region of the coated substrate.

12. The method of claim 10, wherein:
at least one of the coated substrate and the infrared laser beam are translated relative to each other such that the infrared beam spot traces an oscillating pathway that follows the offset line in a translation direction and oscillates between an inner track line and an outer track line; and
the oscillating pathway is disposed on the dummy region of the coated substrate.

13. The method of claim 10, wherein the infrared laser beam traverses a diffractive optical element before irradiating the coated substrate.

14. The method of claim 10, further comprising, prior to directing the infrared laser beam onto the first surface the coated substrate, forming the plurality of defects in the coated substrate.

15. A method for separating a coated substrate, the method comprising:
directing an infrared laser beam onto a first surface of the coated substrate wherein:
the coated substrate comprises a coating layer disposed on a transparent workpiece;
a plurality of defects is disposed within the coated substrate, extending into both the coating layer and the transparent workpiece and disposed along a contour line that divides a primary region of the coated substrate from a dummy region of the coated substrate; and
the infrared laser beam projects an infrared beam spot onto the first surface of the coated substrate; and
the infrared beam spot comprises an annular shape; and
translating at least one of the coated substrate and the infrared laser beam relative to each other such that the infrared beam spot follows an offset line, wherein:

the offset line is disposed on the dummy region of the coated substrate and is offset from the contour line such that the infrared beam spot is projected entirely onto the dummy region and not on the primary region; and the infrared laser beam applies thermal energy to the coated substrate thereby inducing separation of the coated substrate along the contour line.

16. The method of claim 15, wherein when following the offset line, the infrared beam spot applies thermal energy to the dummy region of the coated substrate without melting or ablating the coating layer of the primary region of the coated substrate.

17. The method of claim 15, wherein:

at least one of the coated substrate and the infrared laser beam are translated relative to each other such that the infrared beam spot traces an oscillating pathway that follows the offset line in a translation direction and oscillates between an inner track line and an outer track line; and the oscillating pathway is disposed on the dummy region of the coated substrate.

18. The method of claim 15, wherein:

the infrared laser beam traverses an aspheric optical element before irradiating the coated substrate; and the infrared laser beam traverses a focusing lens before irradiating the coated substrate, wherein:

the focusing lens comprises a focal plane at a focal length from the focusing lens; and the first surface of the coated substrate is positioned relative to the focusing lens such that the focal plane is offset from the first surface of the coated substrate.

19. The method of claim 15, wherein:

the infrared laser beam comprises a pulsed infrared laser beam; and when translating at least one of the coated substrate and the pulsed infrared laser beam relative to each other, the pulsed infrared laser beam impinges the first surface of the coated substrate at impingement locations along the offset line spaced apart a distance of from ¼ a diameter of the infrared beam spot to ½ the diameter of the infrared beam spot.

* * * * *